US011582055B2

(12) United States Patent
Sevindik et al.

(10) Patent No.: US 11,582,055 B2
(45) Date of Patent: Feb. 14, 2023

(54) METHODS AND APPARATUS FOR WIRELESS DEVICE ATTACHMENT IN A MANAGED NETWORK ARCHITECTURE

(71) Applicant: CHARTER COMMUNICATIONS OPERATING, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/996,496

(22) Filed: Aug. 18, 2020

(65) Prior Publication Data
US 2022/0060346 A1    Feb. 24, 2022

(51) Int. Cl.
| | |
|---|---|
| *H04L 41/12* | (2022.01) |
| *H04L 12/28* | (2006.01) |
| *H04N 21/61* | (2011.01) |
| *H04L 47/62* | (2022.01) |
| *H04N 7/173* | (2011.01) |
| *H04N 21/426* | (2011.01) |

(52) U.S. Cl.
CPC ...... *H04L 12/2801* (2013.01); *H04L 47/6215* (2013.01); *H04N 7/17309* (2013.01); *H04N 21/42676* (2013.01); *H04N 21/6118* (2013.01); *H04N 21/6168* (2013.01)

(58) Field of Classification Search
None
See application file for complete search history.

(56) References Cited

U.S. PATENT DOCUMENTS

| | | |
|---|---|---|
| 3,629,862 A | 12/1971 | Chow |
| 6,177,963 B1 | 1/2001 | Foye et al. |
| 7,656,890 B2 | 2/2010 | Chapman et al. |
| (Continued) | | |

OTHER PUBLICATIONS

Banerji S., et al., "On IEEE 802.11: Wireless LAN Technology", vol. 3 (4), 2013, 19 pages.

(Continued)

*Primary Examiner* — Brandon M Renner
(74) *Attorney, Agent, or Firm* — Patent Beach PC

(57) ABSTRACT

Methods and apparatus for enhancing connectivity for a device backhauled by a wireline communication network. In one embodiment, the device comprises a small-cell or other wireless base station that is backhauled by a DOCSIS system within a managed HFC network, and the method and apparatus enable enhanced connection of user devices serviced by the base station (such as 3GPP UE or CBRS FWA) to a core entity for e.g., authentication and packet session establishment. In one implementation, enhanced Cable Termination System (CMTS) and cable modem (CM) devices coordinate to allocate prioritized service flows to traffic sourced from the base station. These service flows can selectively bypass extant DOCSIS protocols which might otherwise increase connection latency (including connection failure) such as AQM (active queue management) and packet dropping algorithms. In some variants, upstream service flow data rates can also be enhanced through temporary utilization of higher-order modulation and/or coding schemes.

20 Claims, 18 Drawing Sheets

(56) References Cited

U.S. PATENT DOCUMENTS

| | | |
|---|---|---|
| 8,005,083 B1 | 8/2011 | Diep |
| 8,041,335 B2 | 10/2011 | Khetawat et al. |
| 9,203,639 B2 | 12/2015 | Thibeault et al. |
| 9,231,748 B1 | 1/2016 | Wurtenberger et al. |
| 9,467,867 B1 | 10/2016 | Hasegawa et al. |
| 9,655,127 B1 | 5/2017 | Srinivas et al. |
| 9,814,044 B1 | 11/2017 | Sevindik |
| 10,045,070 B2 | 8/2018 | Markley et al. |
| 10,575,232 B2 | 2/2020 | Tsuda et al. |
| 11,051,312 B1 | 6/2021 | Marupaduga et al. |
| 2003/0027577 A1 | 2/2003 | Brown et al. |
| 2005/0163196 A1 | 7/2005 | Currivan et al. |
| 2005/0220047 A1 | 10/2005 | Baey et al. |
| 2005/0249117 A1 | 11/2005 | Gerkins |
| 2007/0271588 A1 | 11/2007 | Bunn et al. |
| 2008/0037429 A1* | 2/2008 | Lansing .............. H04L 49/9084 370/235 |
| 2008/0130589 A1 | 6/2008 | Gorokhov et al. |
| 2008/0193137 A1 | 8/2008 | Thompson et al. |
| 2009/0116594 A1 | 5/2009 | Abe et al. |
| 2009/0180490 A1 | 7/2009 | Beser |
| 2010/0117740 A1 | 5/2010 | Hwang et al. |
| 2010/0222003 A1 | 9/2010 | Yoshii et al. |
| 2010/0312892 A1* | 12/2010 | Woundy .............. H04L 41/5054 709/230 |
| 2011/0045856 A1 | 2/2011 | Feng et al. |
| 2011/0142017 A1 | 6/2011 | Coldren |
| 2011/0185263 A1 | 7/2011 | Chapman et al. |
| 2011/0267253 A1 | 11/2011 | Bit-Babik et al. |
| 2011/0268008 A1 | 11/2011 | Kim et al. |
| 2011/0287794 A1 | 11/2011 | Koskela et al. |
| 2011/0299488 A1 | 12/2011 | Kim et al. |
| 2011/0320631 A1 | 12/2011 | Finkelstein |
| 2013/0010686 A1 | 1/2013 | Shatzkamer et al. |
| 2013/0012249 A1 | 1/2013 | Centonza et al. |
| 2013/0021996 A1 | 1/2013 | Wang et al. |
| 2013/0033642 A1* | 2/2013 | Wan ....................... H04N 19/68 348/495 |
| 2013/0074138 A1 | 3/2013 | Chapman |
| 2013/0251019 A1 | 9/2013 | Kolze |
| 2013/0316750 A1 | 11/2013 | Couch |
| 2013/0332815 A1 | 12/2013 | Gallo et al. |
| 2014/0010269 A1 | 1/2014 | Ling et al. |
| 2014/0086194 A1 | 3/2014 | Sugahara |
| 2014/0247743 A1 | 9/2014 | Seo |
| 2014/0294052 A1 | 10/2014 | Currivan et al. |
| 2015/0017999 A1 | 1/2015 | Chen et al. |
| 2015/0139050 A1 | 5/2015 | Sun et al. |
| 2015/0146712 A1 | 5/2015 | Jin |
| 2015/0215790 A1 | 7/2015 | Davari et al. |
| 2015/0327265 A1 | 11/2015 | Lee et al. |
| 2015/0350912 A1 | 12/2015 | Head et al. |
| 2015/0350949 A1 | 12/2015 | Wang et al. |
| 2016/0036490 A1 | 2/2016 | Wu et al. |
| 2016/0095007 A1 | 3/2016 | Tian et al. |
| 2016/0198350 A1 | 7/2016 | Lou et al. |
| 2016/0360553 A1 | 12/2016 | Cheng et al. |
| 2017/0005740 A1 | 1/2017 | Yang et al. |
| 2017/0006483 A1 | 1/2017 | Attanasio et al. |
| 2017/0026819 A1 | 1/2017 | Xue et al. |
| 2017/0086199 A1 | 3/2017 | Zhang et al. |
| 2017/0093555 A1 | 3/2017 | Hamzeh et al. |
| 2017/0265216 A1* | 9/2017 | Andreoli-Fang ... H04L 12/4625 |
| 2017/0302378 A1 | 10/2017 | Mutalik et al. |
| 2017/0359851 A1 | 12/2017 | Kakinada et al. |
| 2018/0054740 A1 | 2/2018 | Furuichi |
| 2018/0070296 A1 | 3/2018 | Srikanteswara et al. |
| 2018/0146483 A1 | 5/2018 | Kobayashi et al. |
| 2018/0160433 A1 | 6/2018 | Kim et al. |
| 2018/0206235 A1 | 7/2018 | Zhu et al. |
| 2018/0242340 A1 | 8/2018 | Pu et al. |
| 2018/0252793 A1 | 9/2018 | Hazlewood et al. |
| 2018/0255464 A1 | 9/2018 | Fodor et al. |
| 2018/0270103 A1 | 9/2018 | Chapman et al. |
| 2018/0288621 A1 | 10/2018 | Markwart et al. |
| 2019/0028220 A1 | 1/2019 | Kecicioglu et al. |
| 2019/0028900 A1 | 1/2019 | Furuichi |
| 2019/0037567 A1 | 1/2019 | Zhao et al. |
| 2019/0116601 A1 | 4/2019 | Warashina |
| 2019/0132098 A1 | 5/2019 | Wernersson |
| 2019/0132170 A1 | 5/2019 | Si et al. |
| 2019/0150134 A1* | 5/2019 | Kakinada ............ H04W 72/048 370/330 |
| 2019/0181564 A1 | 6/2019 | Kwon et al. |
| 2019/0268916 A1 | 8/2019 | Guo et al. |
| 2019/0273528 A1 | 9/2019 | Watanabe |
| 2019/0274064 A1 | 9/2019 | Chapman et al. |
| 2019/0349066 A1 | 11/2019 | Yang |
| 2019/0379421 A1 | 12/2019 | Niakan et al. |
| 2019/0387413 A1 | 12/2019 | Wong et al. |
| 2020/0022036 A1 | 1/2020 | Lee et al. |
| 2020/0092034 A1 | 3/2020 | Jones |
| 2020/0092736 A1 | 3/2020 | Futaki et al. |
| 2020/0145031 A1 | 5/2020 | Karlsson et al. |
| 2020/0145967 A1 | 5/2020 | Park et al. |
| 2020/0187208 A1 | 6/2020 | Hou et al. |
| 2020/0252193 A1 | 8/2020 | Finkelstein |
| 2020/0252933 A1 | 8/2020 | Hmimy et al. |
| 2020/0314793 A1 | 10/2020 | Kumar et al. |
| 2020/0351717 A1* | 11/2020 | Bernstein .............. H04W 28/20 |
| 2020/0358470 A1 | 11/2020 | Dayan et al. |
| 2020/0413325 A1 | 12/2020 | Meredith et al. |
| 2021/0007033 A1 | 1/2021 | Tada et al. |
| 2021/0058879 A1 | 2/2021 | Geng et al. |
| 2021/0083942 A1* | 3/2021 | Finkelstein ............ H04L 67/12 |
| 2021/0092662 A1 | 3/2021 | Takahashi et al. |
| 2021/0126697 A1 | 4/2021 | Kumar et al. |
| 2021/0185541 A1 | 6/2021 | Potharaju et al. |
| 2021/0204231 A1 | 7/2021 | Harada et al. |
| 2021/0211889 A1 | 7/2021 | Buddhikot et al. |
| 2021/0219340 A1 | 7/2021 | Shi et al. |
| 2021/0320399 A1 | 10/2021 | Bisiules et al. |
| 2021/0377960 A1* | 12/2021 | Carl .................. H04W 72/0486 |
| 2021/0385662 A1 | 12/2021 | Furuichi |
| 2021/0400046 A1 | 12/2021 | Castinado et al. |
| 2022/0007198 A1 | 1/2022 | Mahalingam et al. |
| 2022/0045906 A1 | 2/2022 | Petersen et al. |
| 2022/0053491 A1 | 2/2022 | Sevindik et al. |
| 2022/0060347 A1 | 2/2022 | Sevindik et al. |
| 2022/0061090 A1 | 2/2022 | Fehrenbach et al. |
| 2022/0078806 A1 | 3/2022 | Sevindik et al. |
| 2022/0201778 A1 | 6/2022 | Wallburg et al. |
| 2022/0287093 A1 | 9/2022 | Iyer et al. |

OTHER PUBLICATIONS

CableLabs Technical Report CM-TR-MHA-V02-081209.
Chapman J.T., "Mobile Backhaul over DOCSIS", SCTE-ISBE EXPO cable-Tec, Fall Technical forum, 2017.
Deering et al., "Internet Protocol, Version 6 (Ipv6) Specification, IETF RFC 2460," Dec. 1998.
DOCSIS 3.1 Standard "Data-Over-Cable Service Interface Specifications—DOCSIS® 3.1" CM-SP-CM-OSSIv3.1-111-171220.
IEEE Std. 802.11 (1997), or related standards including 802.11 a/b/g/n/s/v/ac/ad/ax/ay/ba or 802.11-2012/2013, 802.11-2016.
"Internet Protocol, DARPA Internet Program, Protocol Specification", IETF RCF 791, Sep. 1981, 50 pages.
Kadir E.A., et al., "Performance Analysis of Wireless LAN 802.11 Standard for e-Learning", 2016 International Conference on Information and Communication Technology, 6 pages.
Planning Today for Next-Gen DOCSIS, Commscope 2019.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
Wi-Fi Direct (including inter alia, "Wi-Fi Peer-to-Peer (P2P) Specification"), Version 1.5, 2014, Wi-Fi Alliance, 90 pages.
Cablelabs, Invention Disclosure 60436, Apr. 2014, https://www.cablelabs.com/wp-content/uploads/2014/04/60436-publish.pdf.
RFC 8034, White, et al., "Active Queue Management (AQM) Based on Proportional Integral Controller Enhanced (PIE) for Data-Over-

(56) References Cited

OTHER PUBLICATIONS

Cable Service Interface Specifications (DOCSIS) Cable Modems", Internet Engineering Task Force (IETF), Feb. 2017.
IEEE Std. 802.11 or related standards including 802.11 a/b/g/n/s/v/ac/ad/ax/ay/ba/be or 802.11-2012/2013, 802.11-2016.

* cited by examiner

METHODS AND APPARATUS FOR WIRELESS DEVICE ATTACHMENT IN A MANAGED NETWORK ARCHITECTURE

RELATED APPLICATIONS

This application is related to co-owned and co-pending U.S. patent application Ser. No. 16/995,407 filed Aug. 17, 2020 and entitled "METHODS AND APPARATUS FOR SPECTRUM UTILIZATION COORDINATION BETWEEN WIRELINE BACKHAUL AND WIRELESS SYSTEMS," which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Background

1. Technological Field

The present disclosure relates generally to the field of data networks and wireless equipment, and specifically, in one or more exemplary embodiments, to methods and apparatus for a user end device attachment and packet data session establishment via wireless and wireline network infrastructure.

2. Description of Related Technology

Data communication services are now ubiquitous throughout user premises (e.g., home, office, and even vehicles). Such data communication services may be provided via a managed or unmanaged networks. For instance, a typical home has services provided by one or more network service providers via a managed network such as a cable or satellite network. These services may include content delivery (e.g., linear television, on-demand content, personal or cloud DVR, "start over," etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere," anytime," so that users (subscribers) can access the desired services (e.g., watch a movie) via a number of different receiving and rendering platforms, such as in different rooms of their house, on their mobile device while traveling, etc.

Similarly, wireless data services of varying types are now ubiquitous. Such wireless services may include for instance (i) "licensed" service, such as cellular service provided by a mobile network operator (MNO), (ii) quasi-licensed (e.g., "shared" spectrum which in some cases may be withdrawn, such as CBRS), (iii) unlicensed (such as Wi-Fi (IEEE Std. 802.11) and "unlicensed cellular" technologies such as LTE-U/LAA or NR-U, as well as IoT (Internet of Things) services.

One common model is to provide localized unlicensed "small cell" (e.g., 3GPP "femtocell") coverage via a service provider such as a terrestrial fiber or cable MSO. These small cells can leverage e.g., 3GPP unlicensed bands (such as NR-U bands in the 5GHz range) or other spectrum such as CBRS (3.550-3.70 GHz, 3GPP Band 48), and C-Bands (3.30-5.00 GHz). Technologies for use of other bands such as 6GHz band (5.925-7.125 GHz such as for Wi-Fi-6), and even mmWave bands (e.g., 24 GHz and above) are also under development and expected to be widely deployed in coming years.

Small cells offer great flexibility for providing effectively shared-access cellular coverage without the CAPEX and other considerations associated with a normal licensed cellular (e.g., NodeB) deployment. Since small cells are designed to service fewer users/throughput, they can also be backhauled by many existing and commonly available forms of infrastructure, such as coaxial cable networks currently managed and operated by cable MSOs. Advantageously, there is a very large base of installed coaxial cable in the U.S. (and other countries), and the cable medium itself is capable of appreciable bandwidth, especially with more recent upgrades of the backhaul infrastructure supporting the coaxial cable "last mile" (e.g., DWDM optical distribution networks, high-speed DOCSIS modem protocols, and converged/edge cable platforms such as CCAP).

Hence, cable MSOs have more recently begun deploying "small cells" (such as CBRS CBSDs, described in greater detail subsequently herein) for their enterprise and residential customers in order to provide wireless coverage and backhaul, whether in high-density urban applications, sub-urban applications, and even low-density rural applications. For instance, in rural applications, such wireless cells in effect greatly extend the last mile of installed cable, providing a wireless backhaul for e.g., residential CPE which could otherwise not be serviced due to lack of a coaxial cable. Conversely, in urban applications, wireless coverage may be spotty due to e.g., large buildings and other infrastructure, and poor coverage can affect large numbers of users due to their higher geographical/spatial density, thereby necessitating small cell use. Common to all of these deployment scenarios is the managed backhaul (e.g., cable) network.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home).

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

FIG. 1 is functional block diagram illustrating a typical prior art managed (e.g., HFC cable) content delivery network architecture 100 used to provide such data services to its users and subscribers, specifically showing a typical approach for delivery of high-speed data (broadband) services to such users via a variety of different end-user configurations.

As shown in FIG. 1 (simplified for illustration), one or more network headends 102 are in fiber communication with a plurality of nodes 113 via fiber ring and distribution network 121. The headend(s) include a DOCSIS-compliant CMTS (cable modem termination system) 103, discussed in greater detail below, which provide for downstream and upstream data communication with a plurality of user or subscriber DOCSIS cable modems (CMs) 125 which service corresponding CPE 127 such as WLAN devices, PCs, etc. The nodes 113 convert the optical domain signals to RF signals typically in the range of 42-750 MHz for downstream transmission, and likewise convert RF domain signals to optical for upstream data in the range of 0-42 MHz. Within the coaxial portion of the network 100, a plurality of amplifiers 114 and tap-off points 115 exist, so as to enable amplification and delivery of signals, respectively, to all portions of the coaxial topography. A backbone 119 connects the headend to external networks and data sources, such as via the Internet or other types of MAN/WAN/internetworks.

Docsis

In the HFC network headend 102 (see FIG. 1A), data is packetized and routed to the requesting user based on the user's network or IP address, such as via the aforementioned high-speed DOCSIS cable modems 125, according to the well-known network-layer and DOCSIS PHY protocols.

The CMTS 103, is the central platform in enabling high speed Internet connectivity over the HFC network. The CMTS consists of various functional components, including upstream and downstream transceivers, MAC schedulers, QoS functions, security/access authentication, etc.

Another key component in the headend 102, is the Edge QAM modulator (EQAM) 205. The EQAM receives e.g., an IP unicast or multicast MPEG transport stream packet over a GigE (Gigabit Ethernet) interface, and produces transport stream on one or more RF channels for transmission over the HFC distribution network 221. The EQAM can also perform other functions such as re-stamp of Program Clock Reference (PCR) timestamps such as for de-jitter processing. Output from the EQAM 205 is combined with video signals (e.g., SDV, analog, etc.) for downstream transmission by the combiner logic 207.

While DOCSIS 3.0 is currently the prevailing technology, DOCSIS 3.1 is rapidly being deployed as an upgrade to DOCSIS 3.0. DOCSIS 3.1 brings many fundamental changes, including Orthogonal Division Multiplexing (OFDM) as the new PHY layer modulation technology. In OFDM technology, the data is converted from serial to parallel, and transmitted on multiple orthogonal carriers simultaneously. Using the orthogonal multi-carrier concept of OFDM modulation improves the downstream and upstream throughput significantly, and reduces the receiver complexity in the CM and CMTS. Furthermore, bounding narrow band subcarriers in OFDM allows creation of wide band channels from 24 MHz to 192 MHz, moving away from legacy 6 MHz (or 8 MHz) channels of the type used in traditional DOCSIS 3.0 deployments. Spectrum utilization is also increased, up to approximately 1.2 GHz.

Another feature introduced in DOCSIS 3.1, is the Low Density Parity Check Code (LDPC) in upstream and downstream to optimize efficiency, provide robustness against narrow band interferers, and burst errors. The LDPC decoding efficiencies ostensibly increase the Signal-to-Noise ratio (SNR), allowing to use higher modulation for upstream and downstream. Prior to DOCSIS.31, the highest order modulation to allow reliable transmission were 64-QAM for upstream, and 256-QAM for downstream. Due to the LDPC error correcting efficiencies, the DOCSIS 3.1 standard supports 4096-QAM in downstream, and 1024-QAM in upstream, allowing the data transmission speed close to the theoretical limits.

DOCSIS 4.0, which is the latest specification for data transmission over cable as of the date of this writing, leverages the DOCSIS 3.1 technology to expand the downstream and upstream spectrum to use full spectrum available for cable network (0 to approximately 1.8 GHz), which is about 600 MHz more than the 1.2 GHz available under DOCSIS 3.1. The Extended Spectrum DOCSIS (EDX) is designed to work over existing cable infrastructure.

Full Duplex (FDX), another feature introduced in DOCSIS 4.0, will allow upstream and downstream traffic to occupy the same part of spectrum, thus doubling the throughput by using the existing HFC network characteristics.

Unaddressed Issues of Prioritizing Wireless Service Flows

As described previously, the CM 125 and CMTS 103 are the two main components in DOCSIS systems. The CM receives/transmits the signal from/to the CMTS, and provides data service to homes and businesses. The CMTS controls and manages the CMs deployed in the field. The medium between CMTS and CMs is a two-way shared medium, in which downstream channels carry signals from the headend to the CMs (and their connected "CPE", which as shown in FIG. 1A, may include 3GPP small cells 127, WLAN APs 129, CBRS CBSDs 131, and other devices such as user PCs 133), and upstream channels carry signals from the CMs to the headend.

The DOCSIS MAC protocol utilizes a "best efforts" request/grant mechanism to coordinate transmission between multiple CMs 125. If a CM needs to transmit anything on the upstream channels, it first must request that the CMTS allocate resources to the CM. The CMTS 103 allocates the resources for the transmission of data to the CMs in the next upstream frame(s) if bandwidth is available, such as via an upstream bandwidth allocation (MAP) message.

Furthermore, the CMTS must assign at least one service flow to each CM 125 to carry best-effort traffic. In order to support different traffic types, the CMTS may assign multiple service flows to each CM, with each flow having its own characteristics and traffic parameters.

In a typical "strand" based wireless network deployment model such as those rural and urban scenarios previously described, a CBSD (which typically is configured to utilize 3GPP LTE or 5G NR "Node B" technology and protocols as the basis for its operation) is backhauled to the network operator core (and MNO core if required) by the MSO's DOCSIS network; i.e., via a CM 125, as shown in FIG. 1A. The CBSD/xNB communicates to the CMTS 103 to transmit and receive traffic via the interposed CM 125.

However, in this strand network deployment model, since the CBSD/xNB uses the existing backhaul for data connectivity to other networks, there can be noticeable loss of data throughput/speed and increased latency in the upstream (US or UL), especially in highly congested areas. This results in large part from each CM 125 sharing one or more common CMTS 103, and the foregoing request/grant cycle for obtaining upstream bandwidth.

Moreover, such DOCSIS UL protocols are often incompatible with preserving critical timing relationships for various types of traffic which they may carry, especially since current CM and DOCSIS protocols do not provide the CMTS with visibility into what equipment is attached to the other end of the CM (i.e., on the customer or premises side). For instance, in the case of a wireless node such as a CBSD/xNB being backhauled by a DOCSIS CM/CMTS, when a user device (e.g., 3GPP UE) located in a congested area makes an attempt to connect to its core network (e.g., EPC/5GC and packet network components thereof) via the CBS/xNB, the backhaul network may not be able to immediately grant the user device (via its CM proxy) the UL resources to establish the connection within the prescribed time limits specified by the e.g., NAS layer requirements of the 3GPP system, or the requirements of a third party server providing voice or chat functionality (e.g., WhatsApp™). In such cases, the user attachment or similar request, which necessarily must be routed back to the EPC/5GC or server as applicable, will be rejected or delayed, and the user will experience a network unavailability and failure to establish a packet session with the core/server. Therefore, the user may be forced to reattempt to initiate the connection repeatedly or at a later time, which results in poor user experience and a high degree of frustration.

Moreover, for certain more critical applications (such a "911" or similar emergency functions, or urgent voice calls such as via a VoIP stack), such unpredictability and inability to connect each time a connection is needed is completely unacceptable.

Likewise, for some other types of applications (e.g., IoT devices with extremely low power resources), a requirement for multiple attempts at connection can rapidly deplete the device resources, thereby leading to premature failure and more frequent user/technician maintenance.

Based on the foregoing, improved apparatus and methods are needed to reduce network connection/attachment latency for user devices served by wireless devices such as small cells/CBSDs, and assure that e.g., UL timing requirements within the wireless network core are respected. Such improved apparatus and methods would ideally provide the foregoing features without large capital expenditures (CAPEX); e.g., via installation of additional cellular base stations with dedicated backhaul in the coverage area.

Summary The present disclosure addresses the foregoing needs by providing, inter alia, methods and apparatus, for inter alia, enhancing connectivity of wireless devices such as small-cell base stations connected to a wireline communication network supporting data backhaul.

In a first aspect of the disclosure, a computerized method of operating a packet network infrastructure is described. In one embodiment, the infrastructure includes at least one packet receiver apparatus and at least one packet transmitter apparatus, and the method includes; identifying at the at least one packet receiver apparatus a first type of equipment connected to the at least one packet transmitter apparatus; based at least on the identifying, causing establishment of at least one prioritized service flow between the at least one packet receiver apparatus and the at least one packet transmitter apparatus; and utilizing the established at least one service flow to route time-sensitive data packets between the at least one packet transmitter apparatus and the at least one packet receiver apparatus.

In one variant, the packet network infrastructure includes a DOCSIS (data over cable service specification) packet data system, the at least one packet receiver apparatus includes a cable modem termination system (CMTS), and the at least one packet transmitter apparatus includes a cable modem (CM). In one implementation thereof, the identifying at the at least one packet receiver apparatus a first type of equipment connected to the at least one packet transmitter apparatus includes identifying at the CMTS a wireless base station connected to the CM based at least in inspecting one or more packet headers for packets transmitted by the CM to the CMTS, the one or more packet headers of the transmitted packets having been marked with a prescribed designation by the wireless base station.

In one configuration of the foregoing method, the wireless base station includes a 3GPP (Third Generation Partnership Project) compliant base station operating within a quasi-licensed frequency band, and the utilizing the established at least one service flow to route time-sensitive data packets between the at least one packet transmitter apparatus and the at least one packet receiver apparatus includes routing at least 3GPP UE (user equipment) attachment message data via the at least one service flow.

In another variant of the method, the utilizing the established at least one service flow to route time-sensitive data packets between the at least one packet transmitter apparatus and the at least one packet receiver apparatus includes avoiding or precluding use of one or more queue management algorithms which are configured to drop one or more queued packets. In one implementation thereof, the packet network infrastructure includes a DOCSIS (data over cable service specification) packet data system, the at least one packet receiver apparatus includes a cable modem termination system (CMTS), and the at least one packet transmitter apparatus includes a cable modem (CM); and the one or more queue management algorithms comprise one or more DOCSIS AQM algorithms.

In another implementation, the causing establishment of at least one prioritized service flow between the at least one packet receiver apparatus and the at least one packet transmitter apparatus includes specifying a plurality of QoS (quality of service) parameters consistent with one or more temporal requirements associated with routing the time-sensitive packets.

In another aspect of the disclosure, computerized modem apparatus for use in a data network is described. In one embodiment, the apparatus includes: a radio frequency (RF) interface; at least one packet data interface; processor apparatus in data communication with the at least one packet data interface and the RF interface; and storage apparatus in data communication with the processor apparatus, the storage apparatus comprising at least one computer program.

In one variant, the computer program is configured to, when executed by the processor apparatus, cause the modem apparatus to: receive first data packets via the at least one packet data interface; determine that at least a portion of the received first data packets are sourced from a wireless access node; and based at least on the determination, forward the at least portion of the received first data packets that are sourced from the wireless access node to a packet receiver apparatus in data communication with the modem apparatus via at least the RF interface.

In one implementation, the computerized modem apparatus is further configured to establish one or more prioritized service flows between the modem apparatus and the receiver apparatus responsive to the forwarding of the at least portion of the received first data packets that are sourced from the wireless access node to a packet receiver apparatus.

In another implementation, the at least one packet receiver apparatus includes a DOCSIS cable modem termination system (CMTS), and the modem apparatus includes a DOCSIS cable modem (CM).

In yet another implementation, the determination that the at least portion of the packets are sourced from a wireless access node includes one of (i) inspection of one or more data fields of a header of one or more of the packets, or (ii) receipt of the at least portion of packets at a prescribed data packet port or socket of the modem apparatus.

In a further implementation, the at least one computer program is further configured to, when executed by the processor apparatus, cause the modem apparatus to queue the at least portion of the packets in a prescribed buffer associated with a service flow created to route the at least portion of the packets to the receiver apparatus. In one such configuration, the at least one computer program is further configured to, when executed by the processor apparatus, cause the modem apparatus to: monitor at least one aspect of the prescribed buffer; and based at least on the monitoring, cause a change to at least one transmission parameter associated with transmission of the queued at least portion of the packets. For example, the at least one aspect of the prescribed buffer includes at least one of buffer depth or fill rate; and the causation of a change to at least one transmission parameter associated with transmission of the queued at least portion of the packets includes negotiation of a modulation and coding scheme (MCS) higher in order than one in use prior to the change.

In another aspect, computerized network apparatus for use in a packet data network is disclosed. In one embodiment, the apparatus includes: at least one first packet data interface for interface with a radio frequency modulation/demodulation apparatus; at least one second packet data interface for interface with a backhaul network; processor apparatus in data communication with the at least one first packet data interface and the at least one second packet data interface; and storage apparatus in data communication with the processor apparatus, the storage apparatus comprising at least one computer program.

In one variant, the at least one program is configured to, when executed by the processor apparatus, cause the network apparatus to: receive first data packets via the at least one first packet data interface; determine that at least a portion of the received first data packets are sourced from a wireless access node in data communication with a modem apparatus, the modem apparatus in data communication with the network apparatus via at least the first packet data interface; and cause establishment of one or more prioritized upstream service flows between the modem apparatus and the network apparatus, the one or more prioritized upstream service flows configured to enable a reduction in both transmission latency and packet loss for at least some subsequent ones of packets sourced from the wireless access node.

In one implementation, the one or more prioritized upstream service flows between the modem apparatus and the network apparatus comprise at least one data flow dedicated to attachment of a wireless client device wirelessly connected to the access node to a core network, the core network in data communication with the network apparatus via the at least one second packet data interface.

In another implementation, the network apparatus includes a CMTS within a hybrid fiber coax (HFC) network, and the wireless access node includes a 3GPP-compliant CBSD (Citizens Broadband Service Device) operative within a frequency band of 3.550 to 3.700 GHz, and the core network includes at least one of a 3GPP EPC (evolved packet core) or 3GPP 5GC (5G Core), and the attachment of the wireless client device includes attachment of a 3GPP UE (user equipment) to the core network via 3GPP attach and session establishment protocols.

In yet another implementation, the network apparatus is further configured to selectively cause the establishment of the one or more prioritized upstream service flows between the modem apparatus and the network apparatus based at least on a detected level of upstream packet data congestion associated with the network apparatus.

In still a further implementation, the one or more prioritized upstream service flows between the modem apparatus and the network apparatus comprise establishment of at least (i) a service flow dedicated to wireless device attachment, and (ii) a user-plane (UP) data supporting service flow.

In another aspect, a method for registration and authentication of a client device (e.g., UE) is disclosed. In one embodiment, the UE being registered is configured to utilize CBRS-band quasi-licensed spectrum, and the method includes communicating data via at least one prioritized connectivity service flow between a CM supporting a serving base station (e.g., CBRS CBSD), and a CMTS that prioritizes the registration/authentication of the UE over the existing data traffic between the base station and the CMTS.

In another aspect of the disclosure, a network architecture for transaction of wireless data with at least one mobile wireless receiver apparatus is disclosed. In one embodiment, the network architecture includes: one or more wireless base stations; a computerized network controller process; at least one mobile wireless receiver apparatus; and one or more computerized modem devices, each computerized modem device in communication with a base station and the computerized network controller process. In one variant, the computerized network controller includes a service flow agent which allocates the service flows to one or more modems in support of their respective base station. The base stations include a packet agent or manager that marks up or designates data transmitted from the base station.

In another aspect, a base station apparatus is disclosed. In one embodiment, the apparatus includes an enhanced CBRS (Citizens Broadband Radio Service)-compliant CBSD that is capable of data communication with mobile user devices or CBRS FWA devices within CBRS frequency bands. In one embodiment, the base station device includes a network interface for, inter alia, connecting to a DOCSIS system via a cable modem. In another embodiment, the base station device includes a packet agent for designating data transmitted from the base station as originating from a base station generically, or a particular base station identity. In an additional aspect of aspect of disclosure, a computerized network packet data controller apparatus is disclosed. In one embodiment, the apparatus includes an enhanced DOCSIS compliant CMTS that is capable of data communication with a plurality of cable modems (CMs) within one or more DOCSIS frequency bands. In one embodiment, the enhanced CMTS includes a service flow agent for allocating one or more service flow to specific CMs supporting respective wireless base stations, including selectively based on upstream congestion experienced by the CMTS.

In an additional aspect of the disclosure, computer readable apparatus is described. In one embodiment, the apparatus includes a storage medium configured to store one or more computer programs, such as a service flow/packet agent module of the above-mentioned enhanced CBSD or CMTS. In another embodiment, the apparatus includes a program memory or HDD or SSD (e.g., 3D NAND flash memory based device) on a computerized controller/base station device.

In another aspect of disclosure, a method of operating a communication network so as to enhance connectivity of certain devices or classes of devices is disclosed. In one variant, the data network includes a hybrid coaxial fiber network with DOCSIS capability, and a plurality of base station (e.g., 3GPP compliant 4G/5G base stations) backhauled by the DOCSIS system, and the method includes prioritizing UE core network attachment procedures or packets within at least the DOCSIS system so as to increase "firt try" connections and attachments to the core. In another variant, IoT device attachments are prioritized in order to, inter alia, conserve their limited batter resources.

In a further aspect of the disclosure, computer readable apparatus including a non-transitory storage medium, the non-transitory medium including at least one computer program having a plurality of instructions is disclosed. In one embodiment, the plurality of instructions are configured to, when executed on a processing apparatus: request a resource (e.g., spectrum) grant to register a base station within the network; receive data relating to at least registration data of the device. In one variant, the resource request (e.g., to a CBRS SAS) is prioritized using one or more established service flows based on data transmission originating from the base station.

In yet another aspect, methods and apparatus for implementing QoE or QoS for certain IP data sessions are disclosed. In one embodiment, the methods and apparatus are configured to establish prioritized DOCSIS service flows for various phases of the IP data session, and selectively utilize the service flows according to QoS parameters associated with the flows to maintain the desired QoS or QoE. In one variant, "end to end" service flow prioritization is used, such as when multiple participants in the session are backhauled by DOCSIS systems, These and other aspects shall become apparent when considered in light of the disclosure provided herein.

Figure 1:
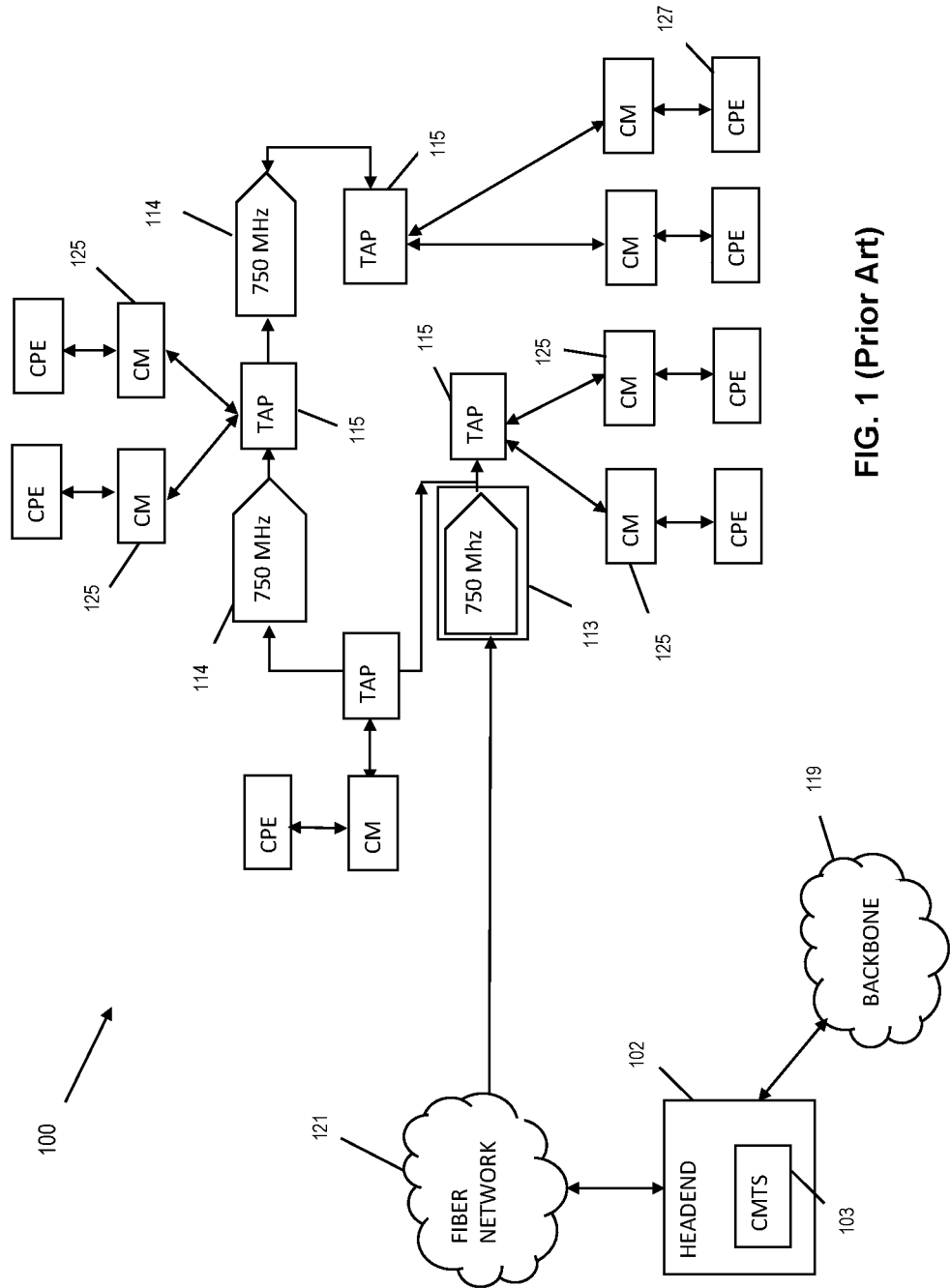
FIG. 1 is a block diagram illustrating a prior art hybrid fiber-coaxial (HFC) data network for delivery of data to end user devices.
Figure 1A:
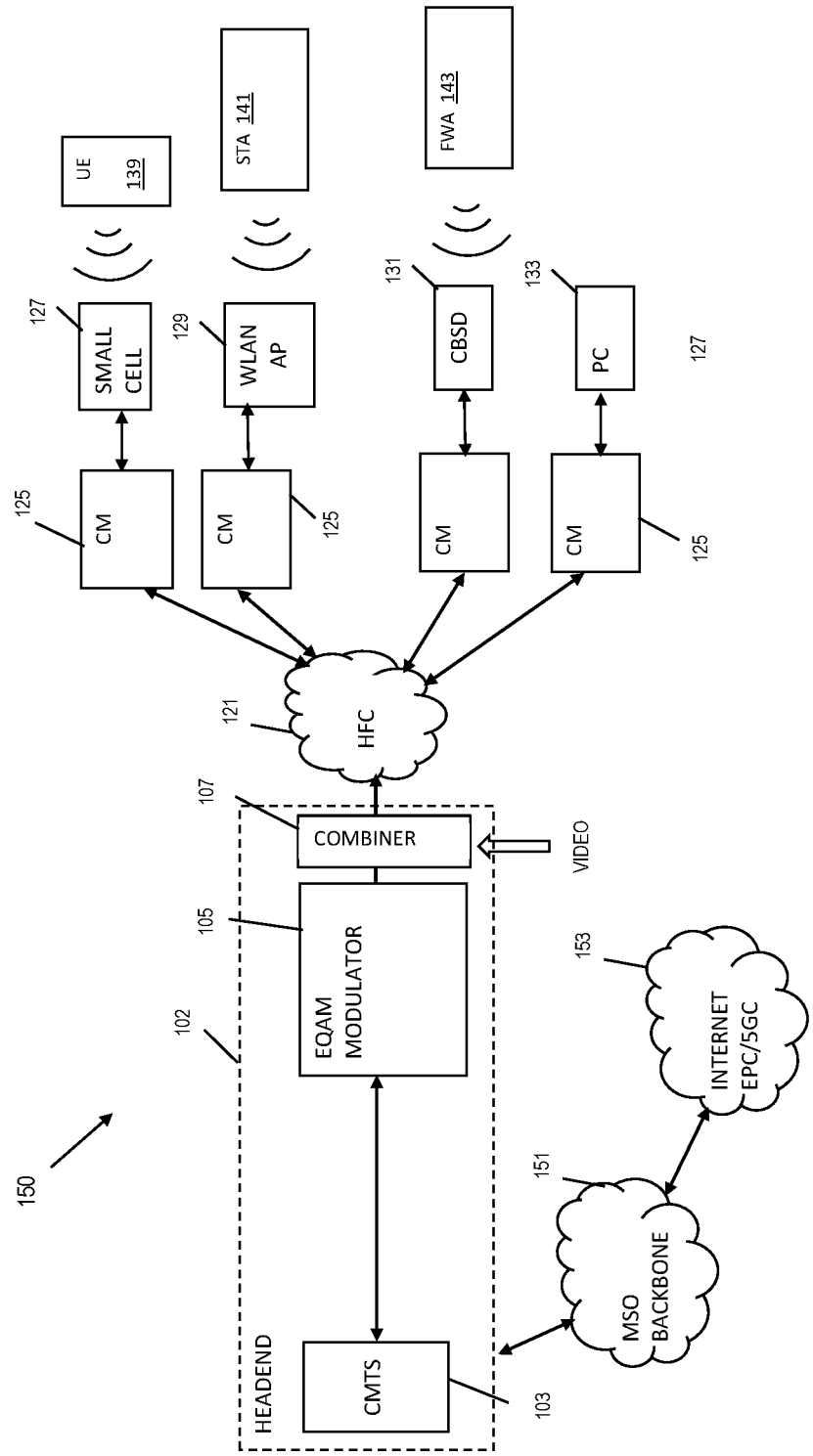
FIG. 1A is a block diagram illustrating the DOCSIS infrastructure of the HFC network of FIG. 1, and various types of backhauled premises devices.

All Figures © Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in Signaling Protocols and Procedures for Citizens Broadband Radio Service (CBRS): Spectrum Access System (SAS) - Citizens Broadband Radio Service Device (CBSD) Interface Technical Specification—Document WINNF-TS-0016, Version V1.2.1. 3, Jan. 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0, and EuroDOCSIS counterparts thereof, as well as so-called "Extended Spectrum DOC SIS.".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc. As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/b or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eUTRAN) and gNBs (5G NR).

Overview

In one exemplary aspect, the present disclosure provides methods and apparatus for enhancing wireless access connectivity of a base station (e.g., a CBRS CBSD operating using 3GPP xNB protocols and technology) backhauled by a DOCSIS data network via a CM.

In one embodiment, an enhanced base station (e.g., CBSDe) is in data communication with an enhanced CMTS (CMTSe) via an enhanced CM (CMe), with the base station providing wireless service and coverage to e.g., FWA and UE devices. The base station has a process operative thereon (e.g., "Packet Manager") that enables designation of IP packets which it frames for upstream transmission so as to enable prioritization of at least portions of the packets transmitted from the base station to the CMTSe via the CMe. In one variant, packets processed by the CBSDe relating to UE or FWA 3GPP "attach" procedures (i.e., requests to the prevailing wireless core function for authentication and packet session establishment) are prioritized so as to avoid normal DOCSIS upstream "request/grant" processes which can result in failure to attach and dropped sessions, such as when a significant amount of congestion exists within the wireline (DOCSIS) network.

In one embodiment, the CMTSe has a process operating thereon (e.g., "Service Flow Manager") that supports prioritizing allocation of the resources to the base station(s); e.g., via establishment of one or more base station-specific service flows (i.e., BS_SYN, BS_ATTACH, and BS_DATA). Packets queued in the these service flows are not subject to the normal request/grant procedures, nor typical packet "drop" protocols such as may be utilized with e.g., DOCSIS AQM (Active Queue Management) or the PIE algorithms (RFC 8034).

In one implementation, the CBSDe PM process marks upstream packets for transmission to the CMTSe via the packet's IP header. The receiving CMTSe identifies the packets sent from the base station via this designated header (e.g., a field therein), and in response enables a "BS_SYN" service flow for the CMe serving the base station. The BS_SYN service flow allows for prioritization in allocate of resources to packets queued within that service flow. Upon receipt of BS_SYN queued packets (indicating that the CBSDe is attempting attachment for a UE or FWA), the CMTSe enables a BS_ATTACH service flow for the CMe. Once the CMTSe receives messages from the CMe queued in the BS_ATTACH queue, the CMTSe may enable a BS_DATA service flow, and user plane (UP) traffic may use this service flow for the transmission of data in downlink and uplink.

In one variant, the CMe monitors the buffers (queues) associated with the prioritized service flows for overflow, and in the case of buffer overflow negotiates with the CMTSe to increase the modulation order to reduce latency.

The exemplary embodiments described herein effectively improve, inter alia, upstream UE/FWA connectivity via prioritizing the service flows associated with the base station, without the need to increase bandwidth or increasing the data buffer size (and the various issues associated therewith). In one sense, the various mechanisms described herein enable an identified base station to "short circuit" normal DOCSIS upstream (and in some configurations, downstream) protocols to support highly time-sensitive operations such as UE/FWA attachment to the wireless core (or even a third-party app server).

In addition, the prioritized service flow mechanisms described herein require only minimal changes to installed infrastructure (e.g., firmware updates to the CBSD, CM and CMTS), thereby obviating installation of new or additional infrastructure such as cellular base station, thereby effectively enhancing customer service and quality of experience (QoE) without extensive CAPEX (capital expenditure).

The methods and apparatus described herein may also advantageously be extended to support other wireless architectures and technologies.

Detailed Description of Exemplary Embodiments

Exemplary embodiments of the apparatus and methods of the present disclosure are now described in detail. While these exemplary embodiments are described in the context of the previously mentioned base stations (e.g., 3GPP eNB or gNB operating within unlicensed or quasi-licensed spectrum) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), wireline networks and architectures that are configured to deliver digital data (e.g., text, images, games, software applications, video and/or voice/audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, Internet Protocol DARPA Internet Program Protocol Specification, IETF RCF 791 (Sept. 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the exemplary SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitation DSA, LSA, or TVWS systems, and those above 4.0 GHz (e.g., currently proposed allocations up to 4.2 GHz, and even millimeter wave bands such as those between 24 and 100 GHz), as well as licensed/leased spectrum such as e.g., Band 12-17 and Band 71 spectrum.

Moreover, while some aspects of the present disclosure are described in detail with respect to so-called "4G/4.5G" 3GPP Standards (aka LTE/LTE-A) and so-called 5G "New Radio" (3GPP Release 15/16/17 and TS 38.XXX Series Standards and beyond), such aspects are generally access technology "agnostic" and hence may be used across different access technologies, and can be applied to, inter alia, any type of P2MP (point-to-multipoint) or MP2P (multi-point-to-point) technology, including e.g., Qualcomm Multefire.

It will also be appreciated that while the primary embodiments of the methods and apparatus described herein are cast in terms of reducing latency and enhancing connectivity of a base stations connected to the DOCSIS data network, the various aspects of the disclosure may find utility in other types of applications, including e.g., that where intermittent connectivity can be established, but is unreliable or has other undesired attributes, such as for e.g., IoT applications.

Other features and advantages of the present disclosure will immediately be recognized by persons of ordinary skill in the art with reference to the attached drawings and detailed description of exemplary embodiments as given below.

Methodology

Figure 3:
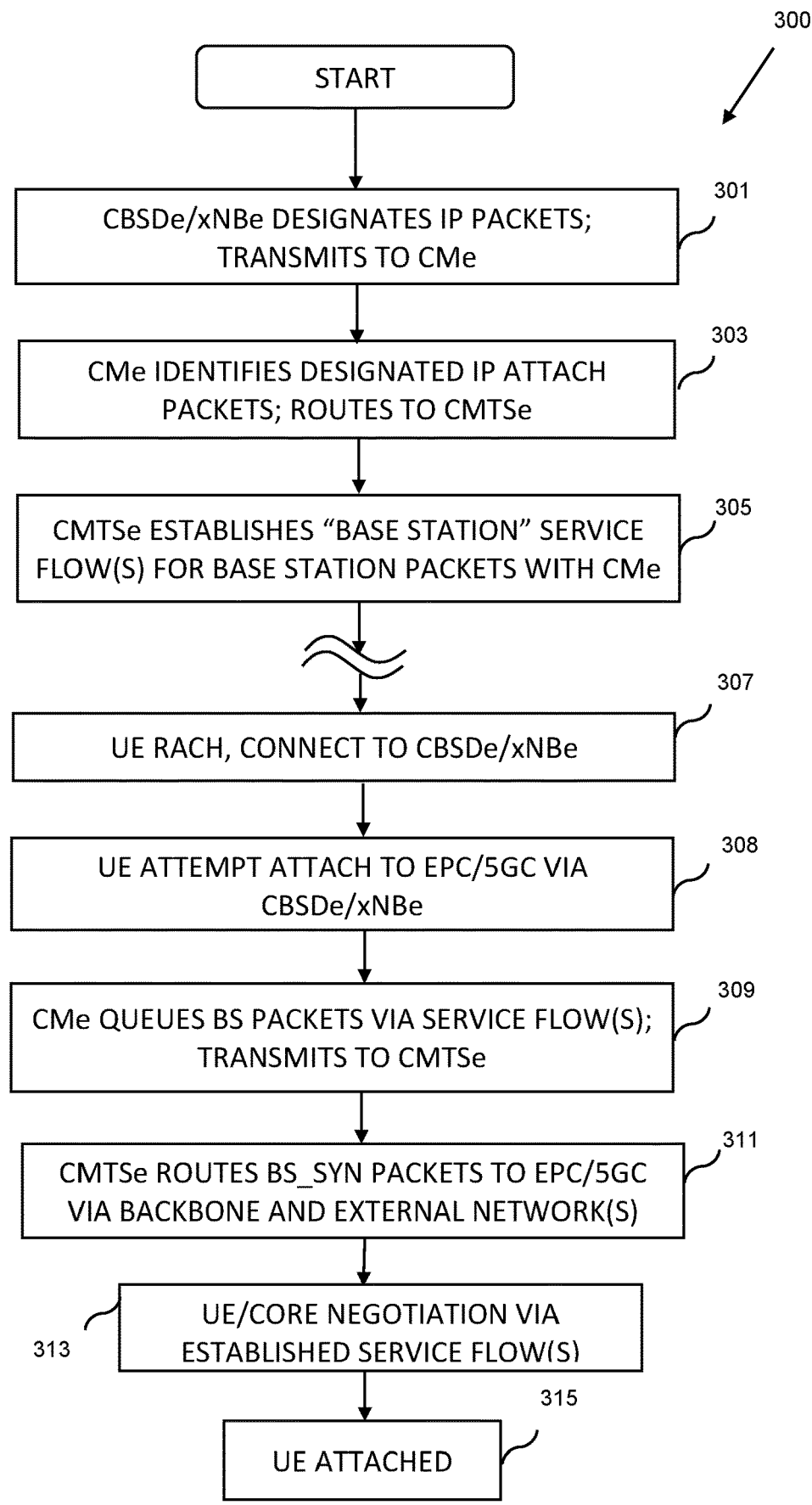
FIG. 3 is a logical flow diagram illustrating one embodiment of a method for attachment request processing via a wireless base station (e.g., CBSD) backhauled via the improved DOCSIS infrastructure of the present disclosure.
Figure 4:
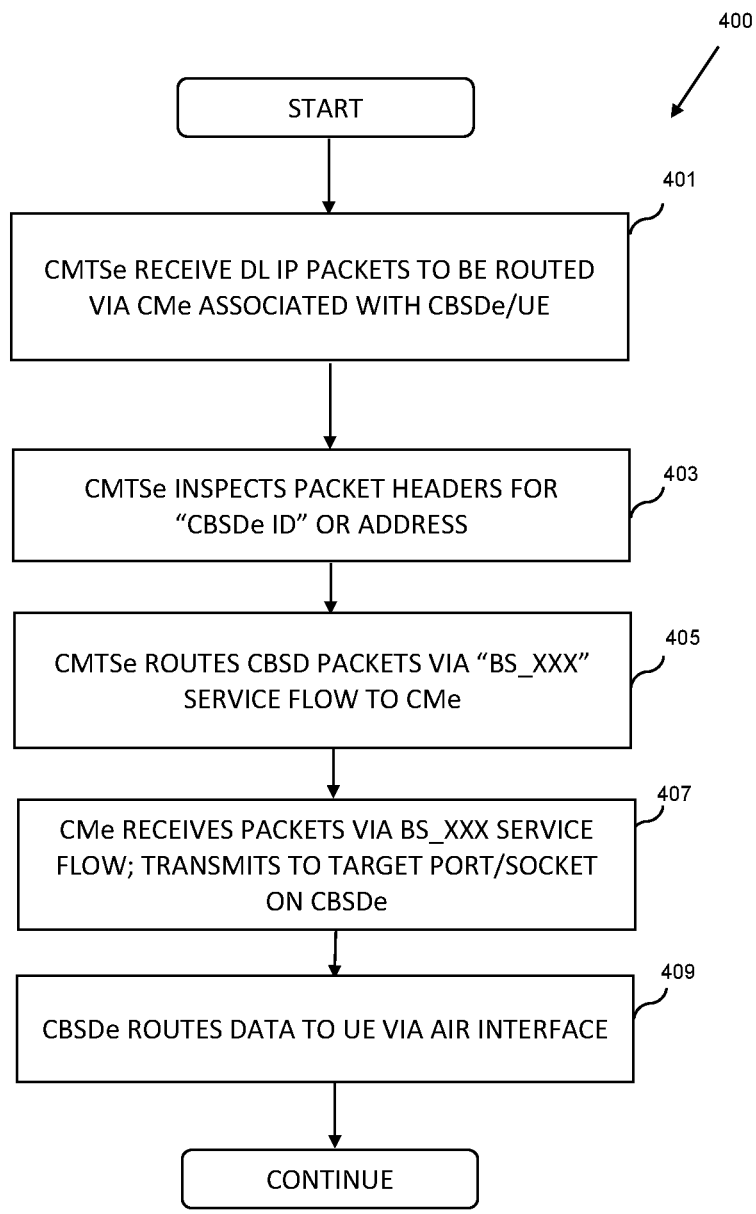
FIG. 4 is a logical flow diagram illustrating one embodiment of a method for DL packet processing via the improved DOCSIS infrastructure of the present disclosure.
Figure 5:
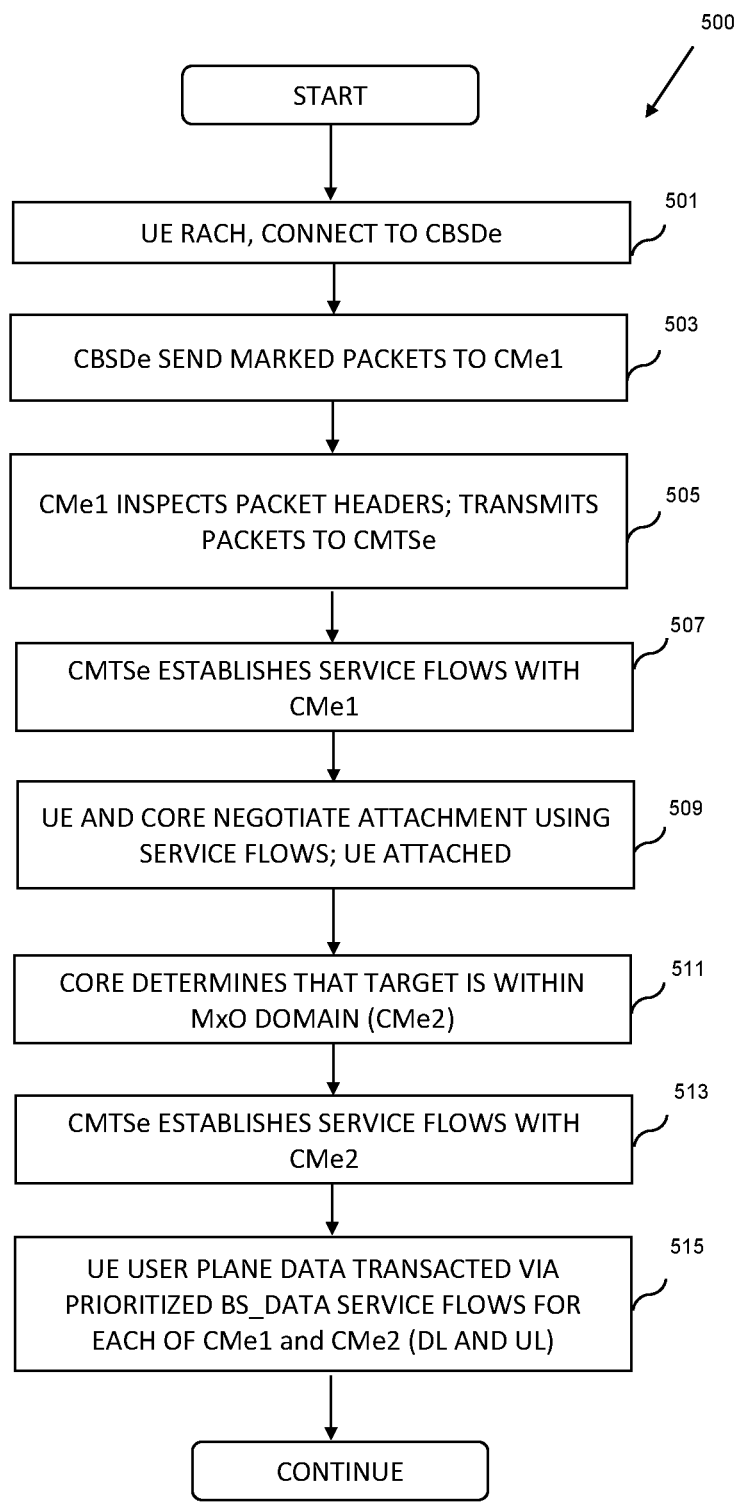
FIG. 5 is a logical flow diagram illustrating one embodiment of a method for end-to-end call session processing via the improved DOCSIS infrastructure of the present disclosure.

Various methods and embodiments thereof for enhancing wireless connectivity and of a wireless device backhauled by a DOCSIS network according to the present disclosure are now described with respect to FIGS. 3-5.

Figure 2:
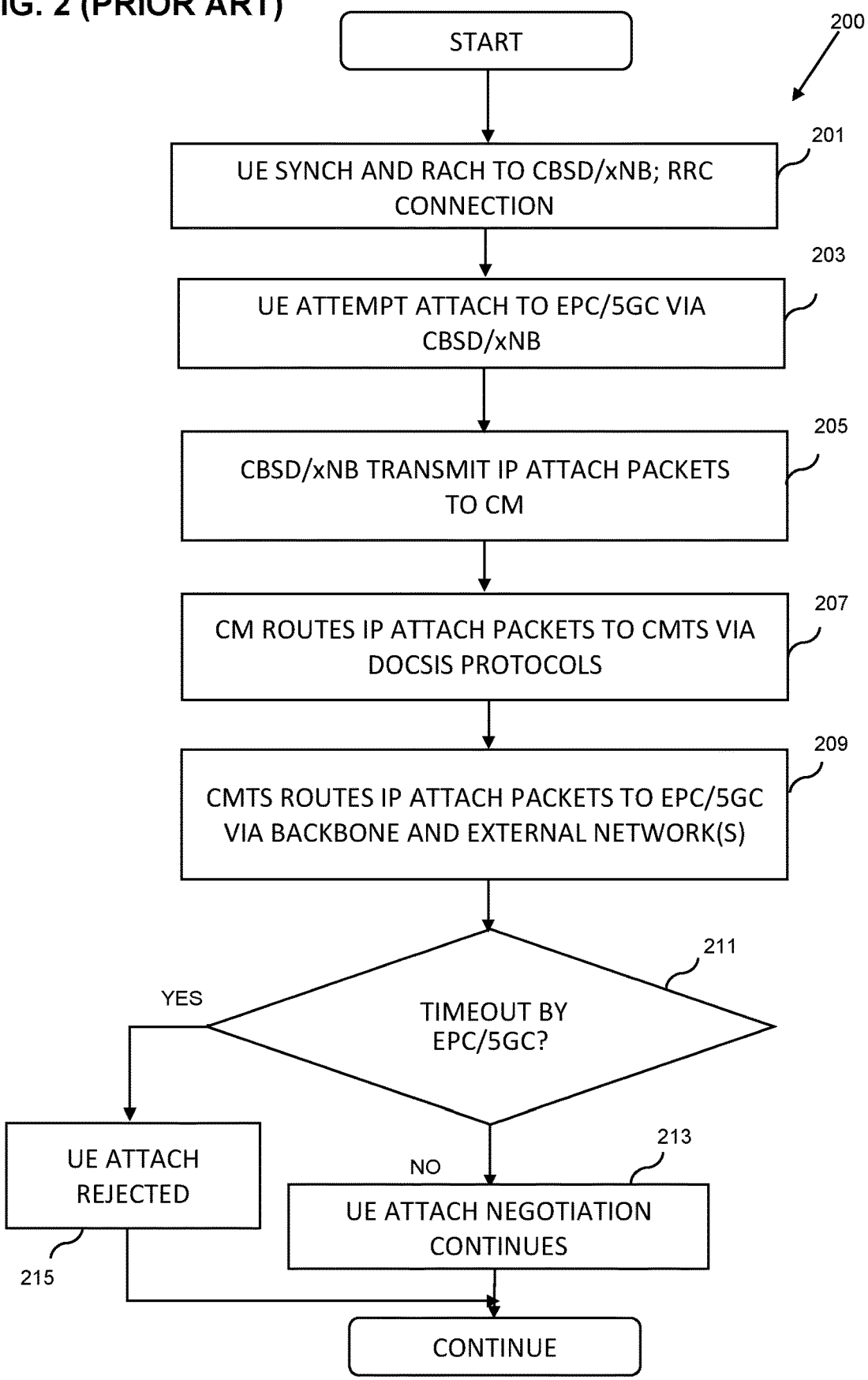
FIG. 2 is a logical flow diagram illustrating a typical prior art attachment request scenario for a wireless base station (e.g., CBSD) backhauled via the DOCSIS infrastructure of FIG. 1A.

However, before discussing these embodiments, it is illustrative to review in detail the operation of extant DOCSIS systems while attempting to attach a wireless device via a base station backhauled thereby. Referring now to FIG. 2, a typical prior art sequence 200 for wireless device attachment is shown. At step 201, the user device (e.g., a 3GPP UE such as a mobile device of FWA) implements so-called "RACH" (random access channel) procedures to synchronize with the base station (e.g., gNB or eNB, hereinafter "xNB"). Pursuant thereto, the UE also subsequently connects to the xNB to establish a radio resource layer connected state (i.e., RRC Connected) via UL and DL shared channels and associated procedures. RACH and RRC procedures are well known, and not described further herein.

Per step 203, when the UE is connected, it then attempts to attach to the network core (e.g., the MME or mobility management entity in an EPC context), such as by including attachment data in a last of the RRC connection status messages.

The xNB passes this data (in the form of e.g., one or more IP packets) to its upstream CM at step 205.

At step 207, the CM routes the received packet(s) to the CMTS via normal DOCSIS protocols. At this juncture, neither the CM nor the CMTS apply any specific significance or context to these packets; they are merely additional IP traffic to be sent upstream. As such, with US/UL bandwidth being limited in general (and even more so in high congestion/usage scenarios), the CM and CMTS will utilize e.g., a "best efforts" approach wherein the CM will request an US resource allocation, and eventually via the MAP message will receive a grant. The issuance and timing of this grant are by no means certain, and as such time-sensitive data transactions such as UE core attach requests may suffer as previously described with respect to FIG. 1.

As a brief aside, for DOCSIS 3.0, downstream channels employ a downstream scheduler process operative at the CMTS that manages the allocation of bandwidth across multiple 6 MHz wide channels among competing service flows (a transport service that provides unidirectional transport of packets). A DS service flow may consist for example of one or more TCP/IP connections terminating at a specific CM, and service flow traffic may be prioritized based on QoS traffic parameters associated with the flow. However, the DOCSIS 3.0 standard does not specify how a specific scheduling implementation should differentially treat data having different priority levels.

Under DOCSIS 3.0, the upstream channel is time division (TDM) multiplexed (or SC-FDMA), and the TDM mode uses transmission slots referred to as mini-slots. Permission to transmit data in a block of one or more mini-slots must be granted by a CMTS to each CM. The CMTS grants mini-slot ownership by periodically transmitting MAP frames on the downstream channel. The MAP also typically identifies some mini-slots as contention slots; for these contention slots, the CMs may bid for quantities of future resources. To minimize collisions for the contention slots, a backoff procedure is employed. Additionally, in the event that a CM has a backlog of upstream packets, it may also "piggyback" a request for mini-slots for the next packet at the end of the then-current packet.

In contrast to DOCIS 3.0, DOCSIS 3.1 DS channel bandwidth is between 24 and 192 MHz, and between 6.4 and 96 MHz in the US. The DOCSIS 3.1 physical layer uses wideband orthogonal frequency division multiplexing (OFDM) channels (downstream) and orthogonal frequency division multiple access (OFDMA) channels (upstream). Due to the use of many subcarriers in an upstream channel, multiple CMs on the same upstream channel can send data packets to the CMTS simultaneously on different subcarriers. This approach enables a very large data bandwidth through the use of only a single channel. Additionally, at the MAC layer, DOCSIS 3.1 continues to support channel bonding. This feature now allows the bonding of OFDM/OFDMA, as well as mixed bonding of legacy single-carrier channels and the OFDM/OFDMA channels (i.e., effectively treating an OFDM/OFDMA channel as a single-carrier channel). DOCSIS 3.1 also requires AQM (Active Queue Management) to reduce the buffering latency in CM and CMTS.

In addition to the "best efforts" service previously described, other services may be used for traffic service flow management (depending on the version of DOCSIS). For example, Non-real-time polling service (NRTPS) can be used for upstream service flows. In this service, the CMTS scheduler sends unicast polls to individual CMs on a fixed interval, in order to determine whether data is queued for transmission on a particular service flow. If so, the CMTS scheduler provides a transmission grant for the service flow. Associated QoS parameters for NRTPS may include Traffic priority, Request Transmission Policy, Maximum Sustained Traffic Rate, Maximum Traffic Burst, Minimum Reserved Traffic Rate, Assumed Minimum Reserved-Traffic-Rate Packet Size, and Nominal Polling Interval.

Additionally, the Real-time polling service (RTPS) may be used for upstream service flows. RTPS is generally analogous to NRTPS, except that the fixed polling interval is contracted. In RTPS, request opportunities that meet the service flows' real-time needs can be selected, and the cable modem may specify the size of the desired grant. QoS parameters for RTPS may include Request Transmission Policy, Maximum Sustained Traffic Rate, Maximum Traffic Burst, Minimum Reserved Traffic Rate, Assumed Minimum Reserved-Traffic-Rate Packet Size, Nominal Polling Interval, and Tolerated Poll Jitter.

Under the Unsolicited grant service (UGS), upstream service flows receive a fixed-size grant at fixed intervals without additional polling or interaction. Thus, UGS eliminates much of the overhead associated with the polling flow types described above. QoS parameters may include Request Transmission Policy, Unsolicited Grant Size, Grants per Interval, Nominal Grant Interval, and Tolerated Grant Jitter.

Unsolicited grant service with activity detection (UGS-AD) is hybrid of the UGS and RTPS scheduling types. When there is activity, the CMTS sends unsolicited fixed grants at fixed intervals to the CM(s). Conversely, when there is no activity, the CMTS sends unicast poll requests to the CM(s) so as to conserve bandwidth. QoS parameters for UGS-AD may include Request Transmission Policy, Nominal Polling Interval, Tolerated Poll Jitter, Unsolicited Grant Size, Grants per Interval, Nominal Grant Interval, and Tolerated Grant Jitter.

For downstream service flows, a similar set of QoS parameters that are associated with the best-effort scheduling type on upstream service flows is utilized. QoS parameters for the DS SFs may include Traffic Priority, Maximum Sustained Traffic Rate, Maximum Traffic Burst, Minimum Reserved Traffic Rate, Assumed Minimum Reserved-Traffic-Rate Packet Size, and Maximum Latency.

Additionally, in e.g., DOCSIS 3.1 contexts (and even some DOCSIS 3.0 installations which have been retrofitted), so-called Active Queue Management (AQM) may be applied in order to facilitate upstream packet queue management. At a high level, during AQM, the CM and CMTS monitor how full their buffers are getting, and as soon as they detect that the TCP (transport control protocol, the transport layer protocol used in conjunction with IP) is keeping the buffer full (or over-full), packets are selectively dropped in order to signal TCP that it needs to reduce flow (i.e., so that lower buffer levels can be maintained). One implementation of AQM is detailed in RFC 8034 (including the so-called "PIE" (proportional integral enhanced active queue management) algorithms, the foregoing incorporated herein by reference in its entirety.

Hence, in totality, extant DOCSIS protocols may, depending on configuration and functionality selected (i) significantly (and unacceptably) delay attach or similar time-sensitive traffic in the upstream, and (ii) may completely drop some or all of the attach packets destined for the EPC/SGC.

Returning to FIG. 2, when the CMTS does receive some or all of the attach packets, they are routed via e.g., the MSO backbone or other networks (internal and/or external) to the 3GPP core functions targeted by the UE/xNB (step 209). Per step 211, if the packets happen to meet maximum latency limits, then the attachment process may continue per step 15. Alternatively, if the limits are not met, the attachment procedure is truncated and the UE request rejected (step 215).

It will be appreciated that FIG. 2 is somewhat of a simplified representation of the actual operations and steps; for instance, data is transacted multiple times between UE and xNB during RACH and connection, and between the xNB and the core during attachment, and hence there may be multiple opportunities for attachment failure during such processes.

With the foregoing as a backdrop, the exemplary methods of providing enhanced connectivity and reduced latency according to the present disclosure are now described with respect to FIG. 3.

As shown in FIG. 3, the method 300 begins with the base station (e.g., enhanced CBSD or CBSDe) designating or "marking up" IP packets being transmitted upstream to the serving cable modem (CMe). These packets may be packets resulting from a UE synchronization or attach process, or other packets from another device or process. In one variant, the header of each packet is annotated by the Packet Manager (PM) process, described subsequently herein, to include a field (e.g., one or two bits within a reserved or other unused portion of the IP packet header structure(s) specified in RFC 2474) which designates the traffic as being sourced from a wireless base station.

Per step 303, the receiving CMe (via its indigenous packet management logic, described below) reads the header and identifies the packet as being sourced from a base station. The packet is then in one embodiment "differentially handled" relative to other (non-BS) packets the CMe may receive and transmitted to the CMTSe; for instance, it may be specifically routed via a prescribed pre-existing service flow (e.g., see the upstream "Primary Service Flow" set forth in the DOCSIS 3.1 Standard "Data-Over-Cable Service Interface Specifications—DOCSIS® 3.1" CM-SP-CM-OS-SIv3.1411-171220, incorporated herein by reference in its entirety), or to a designated port/socket or other target associated with the CMTSe. Depending on when (relative to UE synchronization and attach procedures) the packets are received and transmitted to the CMTSe, and prior operations of the xNBe, one or more special service flows may or may not then exist.

Per step 305, the CMTSe causes the CMe to establish a new service flow (e.g., BS_SYN for synchronization and BS_ATTACH for attachment) if not already established. This is accomplished using e.g., normal DOCSIS 3.0/3.1 service flow establishment mechanisms in one embodiment. As a brief aside, a DOCSIS service flow is defined as a "MAC-layer transport service which provides unidirectional transport of packets from the upper layer service entity to the RF and shapes, polices, and prioritizes traffic according to QoS traffic parameters defined for the Flow." Hence, in one embodiment, the new service flows such as BS_SYN and BS-ATTACH are established as one or more MAC-layer unidirectional packet services consistent with the above DOCSIS 3.1 definition, although service flows of other types may be used consistent with the present disclosure. For instance, a BS_ATTACH service flow may be comprises of two unidirectional flows (i.e., one DS and one US) if desired. As noted previously since congestion and "best efforts" primarily affects the US latency, a single or multiple (US) SF may also be established, with no prioritized DS SF established since latency is presumed low in that direction. In one embodiment, the new BS_SYN service flow is configured to both (i) utilize its own queue apart from any other service flows, and (ii) avoid or bypass AQM processes such as PIE which may selectively drop packets out of the queue under e.g., full or overflow conditions, as previously described. These two features help ensure both uncongested BS_SYN service flow (i.e., only BS-originated packets are handled, and of those handled none are intentionally dropped).

In some variants, packets originated from the base station and marked as such are marked (and treated) generically, regardless of particular type of data being carried. For example, all control plane data may be included within packets marked as originating from the base station, but not specifically described as to the type of payload being carried. Alternatively, such data may be segregated or carried in a differentiated manner, such as data relating to 3GPP core attachment (e.g., the last RRC message as described supra) identified differently in some regard as compared to other control plane data, such as via one or more bits within the designation header field indicating base station traffic. Similarly, user plane data can be differentiated from control plane data, as described in greater detail subsequently herein.

Moreover, per DOCSIS 3.1 mechanisms, the established BS_SYN service flow can have a set of QoS parameters associated therewith, which can be selected to ensure that 3GPP attach procedure latency limits are respected (at least within the MSO's DOCSIS plant).

Returning again to FIG. 3, at steps 307 and 308 of the method 300, a UE at some later time (i.e., after the BS_SYN service flow has been established) commences a RACH/connect/attach sequence as previously described, including attempt to attach to the EPC/5GC (e.g., MME), via the CBSDe. As above, the CBSDe PM generates an IP packet with modified header) containing the attachment request payload, and sends it upstream to the CMe. The CMe reads the modified header, and determines that the packet is "base station" originated (note that the CMe may also have non-BS devices connected to it in tandem with the CBSDe), and queues the packet(s) containing the attach request payload within the queue associated with the new BS_SYN service flow (i.e., for prioritized treatment). As noted above, the packets (i) will not be subject to "best efforts" request/response or AQM processes, and (ii) may have requisite QoS parameters applied, and hence should propagate to the CMTSe (on average) per step 309 much more rapidly than normal "best efforts" US packets, especially in congested upstream environments.

Figure 7:
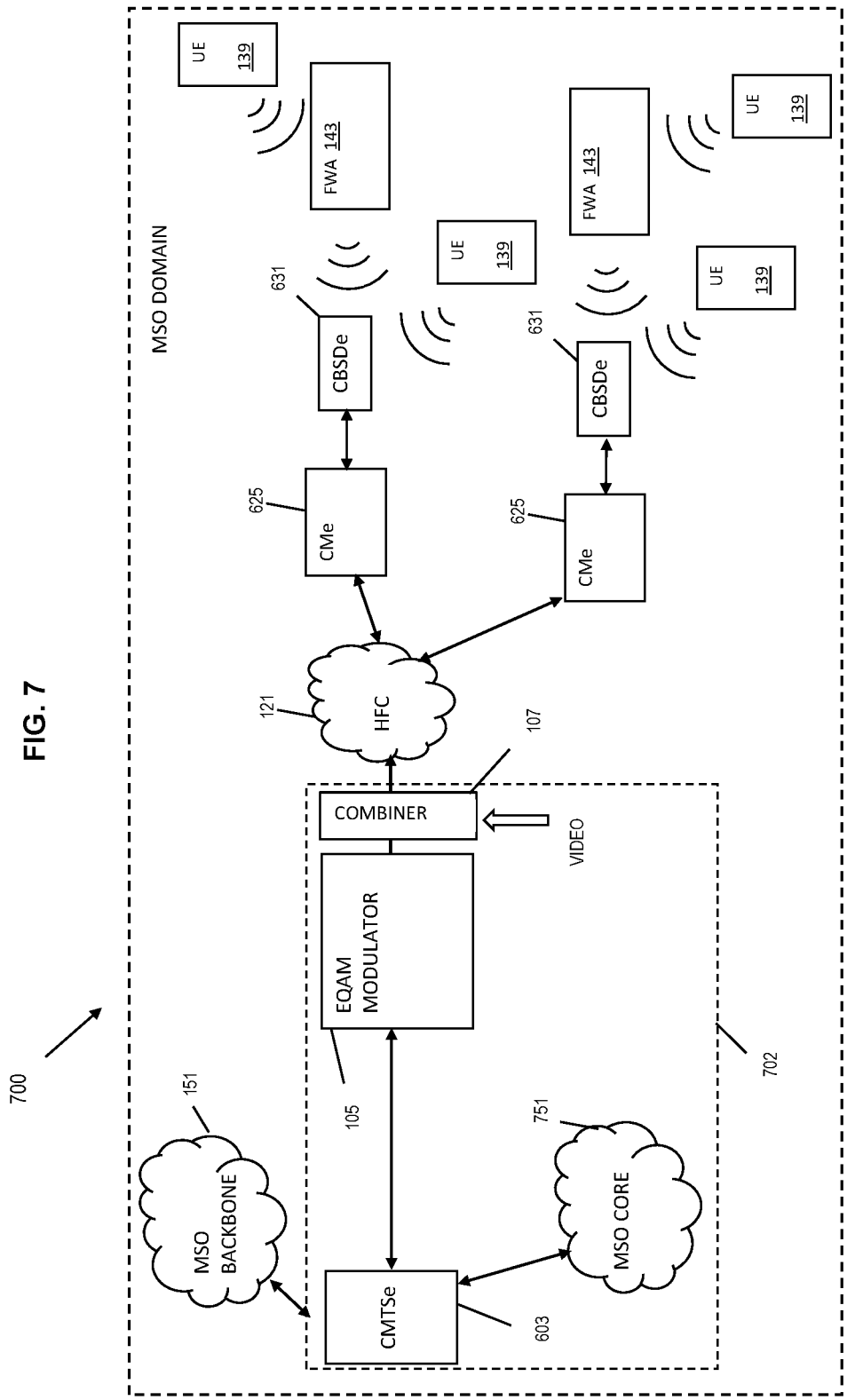
FIG. 7 is a block diagram illustrating another exemplary embodiment of network configuration with enhanced base station connectivity functionality according to the present disclosure.

Per step 311, the CMTSe receives the prioritized attach packets and routes them to the relevant core process (which in some embodiments—see FIG. 7—may be disposed within the MSO infrastructure and even co-located with the CMTSe, thereby effectively assuring no significant additional delays in reaching the EPC/5GC element). In some cases, where external networks are used (and the EPC/5GC is located a great distance topologically speaking from the CMTSe), additional routing mechanisms may be employed by such external networks to assure that, once such packets are out of the MSO DOCSIS system, they are treated with at least some level of prioritization or expedited routing to the necessary 3GPP core functions. For instance, in one variant, packet header inspection is used to identify and selectively route the BS-originated packets to their destination.

Lastly, the UE and core negotiate the attachment per 3GPP protocols (and using the established service flow(s) for at least subsequent UE/CBSDe transmissions/responses) per step 313, and the UE is ultimately attached to the core (including subsequent packet data session establishment) at step 315. Notably, the CMTSe may, where desired, established another service flow (e.g., BS_DATA) such that user-plane traffic can be prioritized via a dedicated service flow in addition to the aforementioned prioritization during UE attachment.

It will be appreciated that the scope and/or duration of prioritization may be varied depending on e.g., operational scenario, network loading, and/or other factors. For instance, in some cases, only network attachment functions are prioritized; once the attachment is completed, the session established pursuant to the attachment may be reverted to non-prioritized (e.g., "best efforts") packet management by the DOCSIS system, especially in cases of very high US data load. As such, a user will at least avoid failed connection attempts, albeit with subsequently lower quality session (user plane) service. Alternatively, the prioritization may be applied across all NAS and UP functions (e.g., all aspects of attachment and session conduct are run through prioritized service flows). As yet another alternative, the foregoing user plane prioritization may expire after a prescribed "honeymoon" period of connection. "Fairness" algorithms may also be applied by the CMTSe/CMe to UP data after attachment. Myriad other such scenarios will be recognized by those of ordinary skill given the present disclosure.

It will also be appreciated that various embodiments may be configured to utilize prioritization in the DS (i.e., from the CMTSe to CMe to CBSDe to UE) as well as US. However, in most DOCSIS networks, DS available bandwidth is much higher, and latency typically very low (owing in part to different service flow and MAC protocol usage), such that potentially attachment-failing delays which may be encountered on the upstream may not occur.

It is also noted that depending on configuration, the CMTSe may apply varying rules regarding service flow instantiation and tear-down for a given base station/CMe based on factors such as network congestion. As discussed in the examples above, one scenario for instantiating special service flows for the base station occurs when a UE attempts to synchronize and connect with the base station and attach to the core. If the prioritized service flow(s) is/are not established at that point, the UE's "first try" can be used as a trigger for such establishment of the flow(s) by the CMTSe; thereafter, subsequent attempts by the UE (or another UE), at least for a period of time at attachment will encounter already established flows. However, in that perpetual maintenance of e.g., the SYN flow in effect "costs" the wireline system resources (the control plane packet payload is small and intermittent, but maintaining the service flow active may divert resources away from other CMs on the network by unnecessarily consuming one of a limited number of flows that can be established by the CMTSe), algorithms within the CMTSe can in some embodiments cause the CMTSe to selectively tear down existing prioritized service flows when certain criteria are met, such as e.g., (i) a high degree of network congestion or demand, (ii) reaching the CMTSe's limit on a maximum number of service flows, and/or (ii) inactivity on any of the flows associated with a given CMe/BS.

Moreover, a given UE and CBSDe/xNBe may be requesting attachment at a time when, even if no prioritized service flow pre-exists, congestion and latency are sufficiently low such that attachment may successfully occur even with no prioritized treatment (i.e., using DOCSIS best efforts). Hence, some models of the CMTSe logic described herein may rely on data gleaned directly or indirectly from the CMe (or from the xNBe) to determine when and under what conditions prioritized service flows should be established/torn down. For instance, an xNBe/CMe strand which indicates frequent attachment by UEs (especially two or more different ones) over time may be indicative of a relative "hot spot", and as such the CMTSe logic may decide that it is worth the resource investment to maintain one or more prioritized service flows associated with that xNBe/CMe active on a constant basis. Conversely, low-activity cells/CMe such as where a single user only intermittently attaches to the core can be subject to one or more of the criteria stated above, such as tear-down of any prioritized flows after a given period of time, given period of no activity, etc. Service Level Agreement (SLA) or subscription tier may also be utilized as at least one input to the CMTSe logic. For example, where a given CMe is associated with a "Gold" level subscriber of the MSO (e.g., the CMe MAC address or IP address is correlated to a Gold level subscription), that CMe and any CBSDe/xNBe attached thereto might be given more persistent service flows (whether for SYN flow only, or also for user data plane traffic as previously described) for the xNBe as compared to a lower-tier subscriber/CMe.

Yet other scenarios may dictate different treatment, such as where every CMe maintains an active prioritized SYN service flow only with its parent CMTSe, so as to support high reliability (such as for 911 or similar emergency calls or services). As referenced elsewhere herein, certain IoT-based applications may also dictate a constant/reliable service flow (albeit with low payload data). In one such embodiment, the IoT device may "piggy back" on the SYN service flow that is maintained for a UE of the premises. For instance, the IoT base station (e.g., operating using an IEEE 802.15.4, BLE, or other such air interface) may mark its user plane/payload packets transmitted to a connected CMe as "base station" packets (e.g., SYN) packets that are transmitted using an established SYN service flow; since the IoT payloads are so small relative to normal UE user plane traffic such as video or data files, the control plane pathways established for the UE's use are more than adequate to support low-frequency, intermittent UP data issued by the IoT base station. It will also be appreciated that the establishment of service flows (e.g., by the CMTSe between itself and a CMe) can be conducted according to various schemes, including in a sequential or stepped fashion based on occurrence of certain events. For instance, in one variant, the CMTSe creates the three different service flows specific to base station traffic (SYN, ATTACH and DATA) in that order. The first-established SYN SF has the highest priority, has its own queue in the CMe, and it is not mixed with other traffic. Moreover, no queued SYN packets are allowed to be dropped because of buffer overflow or AQM functions. Once the CMTSe starts receiving actual SYN packets via the SYN service flow, the CMTSe enables the ATTACH service flow, and will direct the CMe to enable this service flow as well. Likewise, after the CMTSe receives any ATTACH queued traffic from the CMe, the DATA service flow is lastly enabled, and any user traffic will use this service flow in both in downlink and uplink.

Figure 3A:
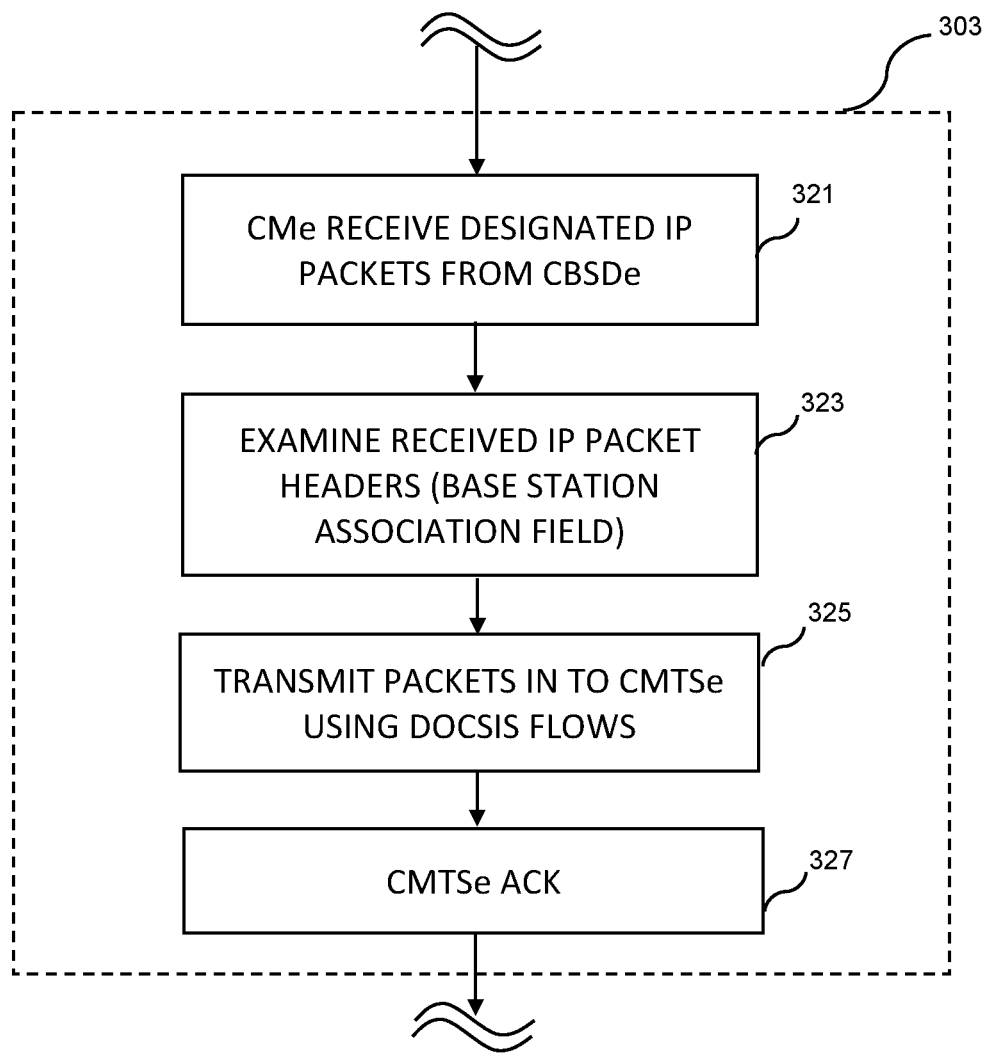
FIG. 3A is a logical flow diagram illustrating one implementation of the CMe packet identification process of FIG. 3.

FIG. 3A is a logical flow diagram illustrating one implementation of the CMe packet identification process of FIG. 3. As shown, in one implementation of step 303 of FIG. 3, the CMe first receives the marked or designated IP packets from the CBSDe per step 321.

Next, at step 323, the packet header(s) is/are examined, and the BS identification/association field is read.

Per step 325, the packets are then transmitted to the CMTSe (with CMTSe ACK per step 327) using normal DOCSIS flows, such as e.g., "best efforts" approaches as previously described. It will be recognized that in this embodiment, the CMTSe is being "primed" by the CMe to recognize that a BS (e.g., CBSDe) is attached to that CMe, and as such if no UE/FWA connection is imminent, this priming can take place at normal DOCSIS upstream latency. Moreover, some of these packets may be dropped by AQM, but if the CMe sends several of them (i.e., marks every US IP traffic packet with a BS association field), one is bound to get through and be flagged by the CMTSe for purposes of identifying "BS attached."

Figure 3B:
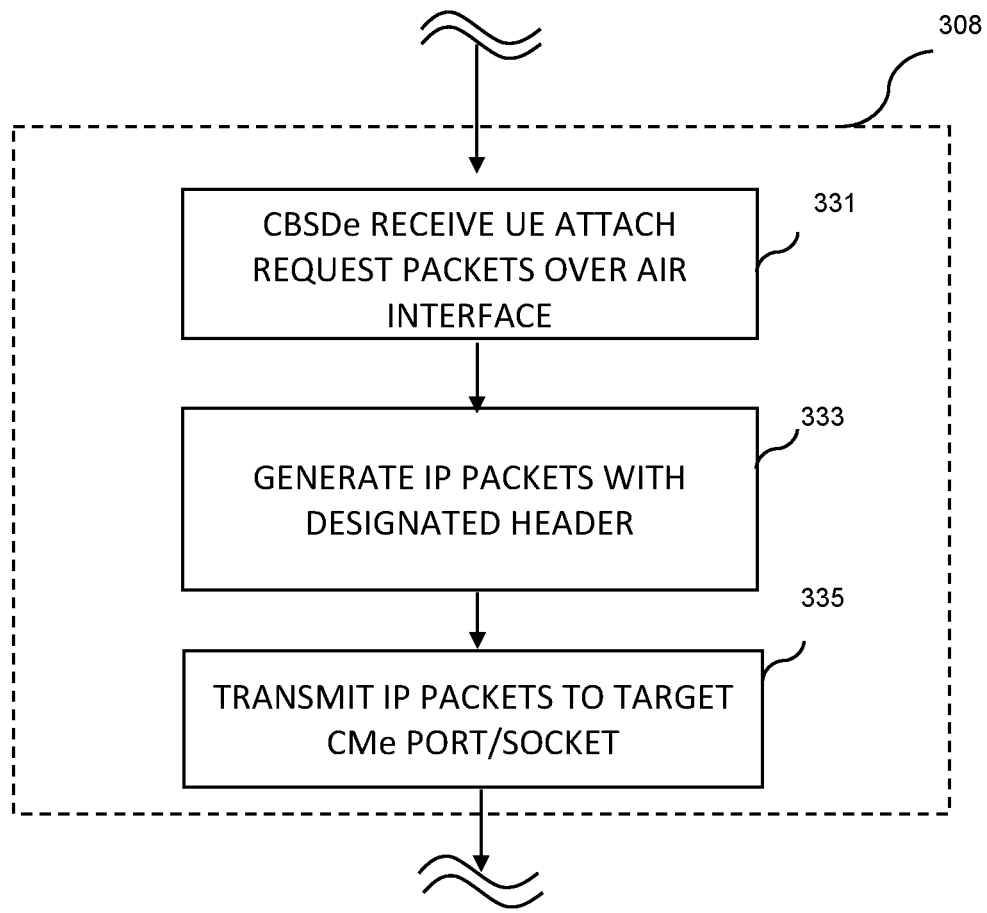
FIG. 3B is a logical flow diagram illustrating one implementation of the CBSDe attach packet receipt identification process of FIG. 3.

FIG. 3B is a logical flow diagram illustrating one implementation of the CBSDe attach packet receipt identification process of FIG. 3. As shown, in one implementation of step 308 of FIG. 3, the CBSDe first receives the UE attach packets (e.g., in the form of NAS attach request payload within the RRC Connection Setup Complete message) per step 331.

Per step 333, the CBSDe generates IP packets encapsulating the attachment request (i.e., in the form of an S1AP Attach Request and PDN Connection Request) within IP packets which have a marked header indicating BS association. Other data such as the 3GPP TAI and EGCI may also be included.

Lastly, per step 335*m* the CBSDe transmits the IP packets (via TCP) to the CMe, such as to a target port or socket, for queuing within the applicable service flow (e.g., BS_SYN).

As previously alluded to, either (or both) explicit or implicit packet type designations can be utilized consistent with the present disclosure. In one such approach, the packets (e.g., IP header) are explicitly designated with a differentiated type designation indicating e.g., that the packet is a SYN, ATTACH, or DATA packet. In another approach, the packet types are implicitly determined based on address routing (e.g., those targeted by the CBSDe/xNBe for a particular port or socket of the CMTSe are known to be of a first type, those targeted for another port/socket another type, and so forth).

Figure 3C:
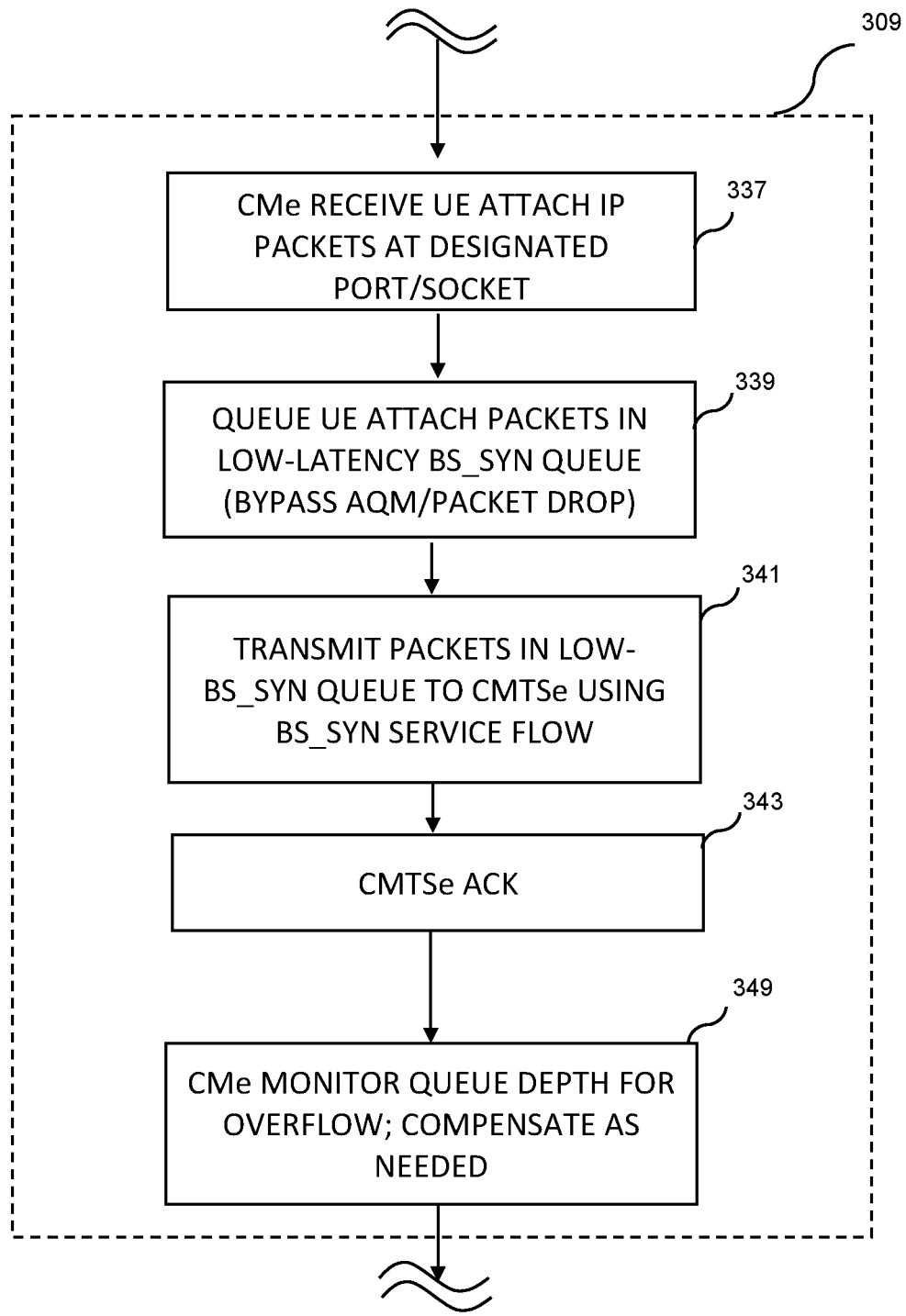
FIG. 3C is a logical flow diagram illustrating one implementation of the CMe attach packet receipt and queueing process of FIG. 3.

FIG. 3C is a logical flow diagram illustrating one implementation of the CMe attach packet receipt and queueing process of FIG. 3. As shown, in one implementation of step 309 of FIG. 3, the CMe first receives the UE attach IP packets from the CBSDe (see step 335 discussed above) per step 337.

Next, at step 339, the received packets are queued in the low-latency/prioritized queue (e.g., for BS_SYN), which bypasses all AQM and packet drop algorithms such as via exclusion of the queue from the scope of AQM.

Per step 341, the queued packets are transmitted to the CMTSe using the designated service flow, and receipt is acknowledged per step 343.

Figure 3D:
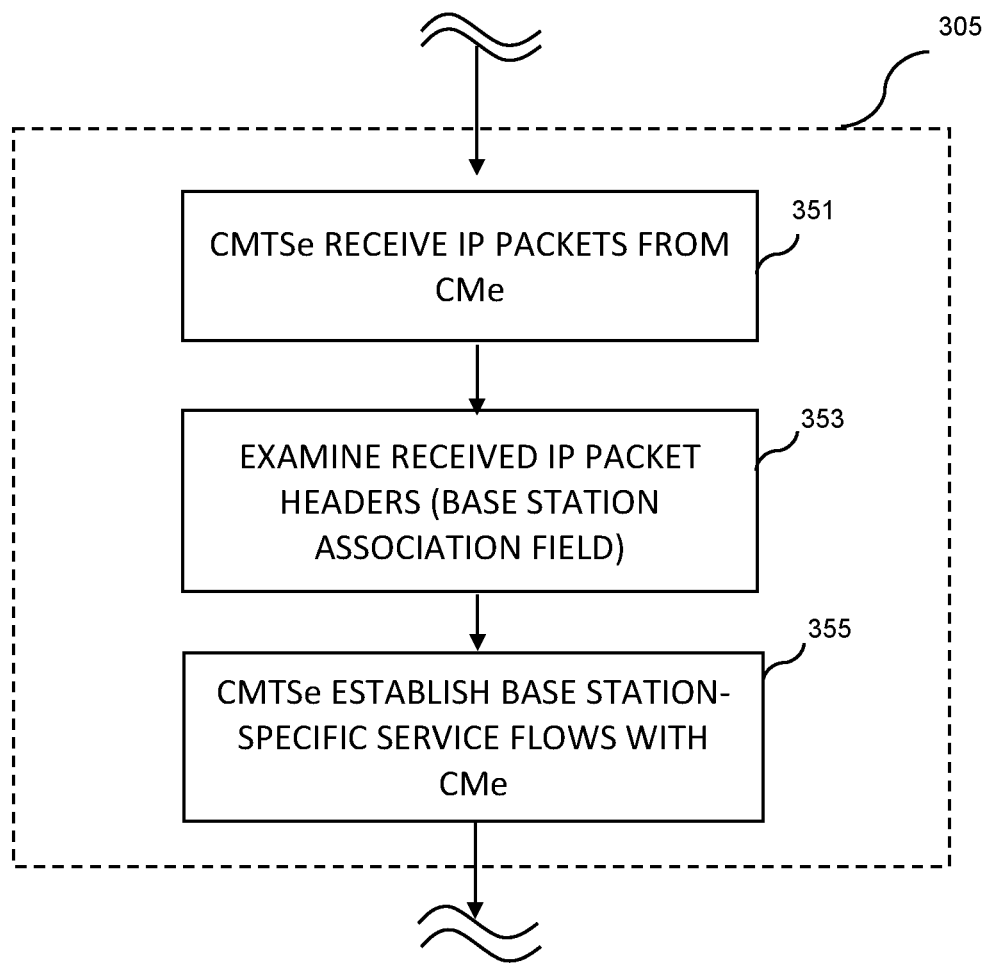
FIG. 3D is a logical flow diagram illustrating one implementation of the CMTSe packet identification and flow establishment process of FIG. 3.
Figure 3E:
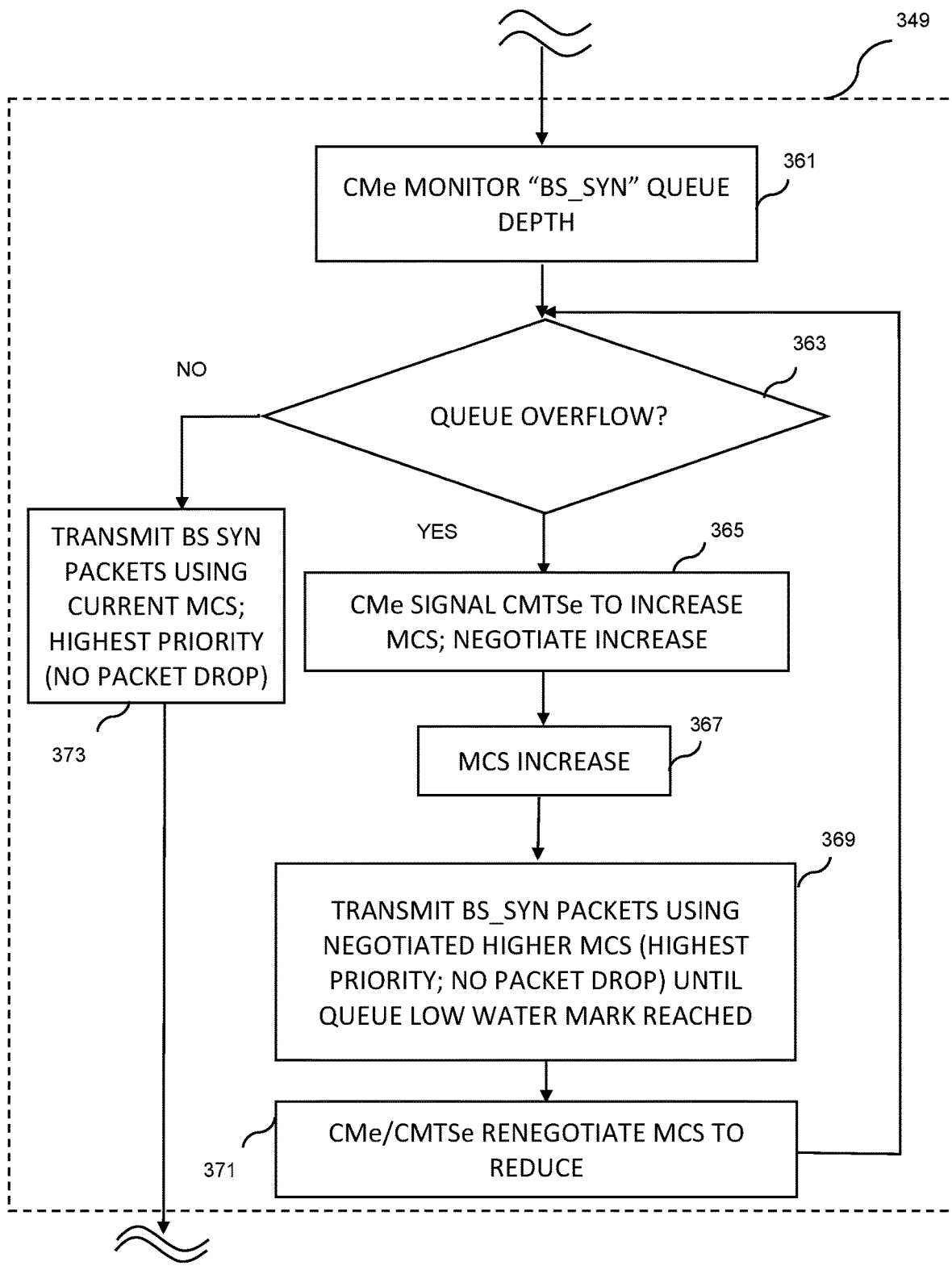
FIG. 3E is a logical flow diagram illustrating one implementation of the CMe queue monitoring and management process of FIG. 3.

During the transmission process, per step 349, the CMe monitors the transmission queue (e.g., for fill level, fill rate, and/or other parameters) to detect current or incipient overflow condition, and compensates as needed (see FIG. 3E).

FIG. 3D is a logical flow diagram illustrating one implementation of the CMTSe packet identification and flow establishment process of FIG. 3. As shown, in one implementation of step 305 of FIG. 3, the CMSTe first receives the marked or designated IP packets from the CMe per step 351. These may have been transmitted using normal upstream "best efforts" flows (e.g., when the CMSTe is being "primed" as previously described), or via an established prioritized service flow such as BS_SYN after the CMTSe has been made aware of the presence of the attached BS for the given CMe. It will also be recognized that where the CMTSe designates a particular mechanism or modality for receipt of BS-originated packets (e.g., at a particular port or socket), packet header inspection for base station association may be obviated because it is assumed that only BS-associated packets will utilize that mechanism.

Per step 353, the received packets are examined to identify base station association, and per step 355 the CMTSe responsively established one or more prioritized service flows (or additional service flows, depending on context) with the CMe.

FIG. 3E is a logical flow diagram illustrating one implementation of the CMe queue monitoring and management process of FIG. 3. As shown, in one implementation of step 349 of FIG. 3C, the CMe first monitors the BS-SYN queue depth (and/or fill rate) per step 361. If the queue is overflowing (or projected to overflow based on rate) per step 363, the CMe signals the CMTse to request increase of the MCS (modulation and coding scheme) used for servicing the prioritized service flow queue. For instance, as previously discussed, DOCSIS 3.1 (and 4.0) support many higher-order MCS values, such as 4096-QAM. Hence, if the queue is in danger of overflow using e.g., 256-QAM as previously negotiated or defaulted to, the CMe and CMTSe can negotiate a higher rate to "drain" the queue per steps 367 and 369. As above the packets are not subject to AQM.

When the queue is sufficiently drained, the CMTSe and CMe can negotiate a lower rate per step 371, such as return to the prior value, or alternatively a next-highest or other rate which can be selected in order to mitigate the recurrence of the overflow (at least ostensibly). For example, based on rate-of-fill or other data, the algorithm may select a target rate during re-negotiation which would keep the buffer level or depleting.

FIG. 4 is a logical flow diagram illustrating one embodiment of a method for DL packet processing via the improved DOCSIS infrastructure of the present disclosure. In this method 400, the DL (in addition to the UL) is managed for latency, such as in cases where DS congestion or latency may also exist (albeit much more unlikely than upstream congestion/latency). While less likely, latency on the DL may also trigger connection/attachment issues, since several UL and DL messages are exchanged during normal 3GPP attachment protocols, such as for authentication.

Per step 401 of the method 400, the CMTSe receives DL IP packets to be routed to the CMe associated with the target CBSDe/UE. At step 403, the CMTSe inspects the packet headers for identifying information that would indicate that the packet is destined for a base station, such as an ID uniquely associated with the CBSDe or a process operative to execute thereon. Unlike the upstream case, the network process issuing the DL packet (e.g., an EPC issuing an attach response, authentication response, etc.) will typically not be configured to make packets as destined for a BS, since the core/EPC protocols do not require such. If the EPC/5GC is MSO-maintained, such DL marking may be implemented, but generally will not be available in other circumstances. As such, the CMTSe must inspect the packets for information which uniquely identifies equipment on a particular cable "strand" (e.g., the CMe, or the CBSDe connected thereto, or even the UE connected to that CBSDe). Hence, in one variant, a PCI or other 3GPP identifier uniquely associated with that CBSDe, or an IP address assigned to that CBSDe, can be "sniffed" by the CMTSe via e.g., packet inspection algorithms or an address correlation algorithm to determine that the traffic is going to a given CBSDe, and accordingly should be assigned to an extant service flow (e.g., BS_SYN or BS_ATTACH) associated with the CMe serving that device (step 405).

Per step 407, the target CMe receives the packets via the BS_XXX (e.g., SYN or ATTACH) SF, and transmits to a target port or socket on the CBSDe, wherein the packet data is then provided to the target UE via the air interface (PHY) between the CBSDe and UE/FWA.

FIG. 5 is a logical flow diagram illustrating one embodiment of a method for end-to-end call session processing via the improved DOCSIS infrastructure of the present disclosure. In this method 500, two session endpoints (e.g., two callers on a VoIP call) are each served by an MSO-based core function, as well as respective CMe's. As such, the MSO is uniquely positioned to control the conduct of the intervening DOCSIS systems for both call setup and call conduct (i.e., user plane data in both UL and DL for each participant can be controlled, such as to maximize call quality).

Per step 501, a given caller device (e.g., mobile UE) performs 3GPP RACH and connection procedures with its serving CBSDe.

Per step 503, the CBSDe marks the e.g., attach packets as previously described, and transmits them to its corresponding CMe.

Per step 505, the receiving CMe inspects the packet headers (or otherwise identifies the packets as having BS association such as via port/socket/flow received over), and transmits them to its serving CMTSe (which may be the same one used by the other call participant, or other).

Per step 507, the CMTSe establishes one or more prioritized service flows with the originating CMe (CMe1), now recognizing that a BS is attached to CMe1.

Per step 509, the UE and core negotiate attachment and one or more packet data sessions using the created prioritized service flow(s), and the UE is ultimately attached to core and a session created.

Per step 511, which may be concurrent with step 509, the core also identifies the target IP address for the session as being within the MSO's service domain, and accordingly causes the CMTSe (here, assumed to be the same CMTSe for simple illustration) to establish one or more prioritized service flows with the recipient CMe (CMe2) per step 513. As such, both CMTSe/CMe "legs" of the call or session are conducted under prioritized service flows (which notably may be homogenous or heterogeneous in nature and configuration).

Lastly. Per step 515, the user plane (UP) data is transacted via one or more prioritized flows (e.g., BS_DATA) for each of the CMe (CMe1 and CMe2).

Notably, the foregoing example can apply to a variety of different call or session models. For instance, CMe2 may be backhauling a third party app server, while CMe1 is backhauling a BS that is connecting a UE running an IP session-based app (e.g., WhatsApp as previously discussed). Connection timeout or other such requirements may exist, and hence prioritized treatment within the DOCSIS domain in required, especially under very heavy congestion environments.

Moreover, it will be appreciated that the foregoing methodologies in general can be applied to any time-sensitive connection or transaction requirement scenario. For instance, online tokenization environments (such as for debit or credit card payment) may utilize stringent timing requirements for e.g., useable "lifetimes" of tokens, access to token vaults, etc. Such applications are not necessarily used over a mobile device such as a 3GPP UE and associated xNB, and hence even non-BS applications connected to CMe can benefit from the methods and apparatus described herein.

Similarly, in other variants, base stations or other access nodes serving IoT applications may be configured consistent with the above approaches to enable selective establishment of service flows in support of critical IoT functions, or for other purposes. For instance, a wireless node backhauled by a DOCSIS system might be optimized for prioritized service flow for its UP data, and/or connectivity, based on the particular application. Many IoT sensors or other devices are battery-powered devices, and repeated failed connection attempts can rapidly drain such devices of energy. Similarly, if data retransmissions (such as via ARQ or other mechanisms based on ACK/NACK) or not successfully completed due to e.g., upstream latency within the DOC SIS system during congestion, then critical data (e.g., security related data) might be unacceptably delayed in reaching its designated target address (e.g., an IP address of a third party IoT server or the like). As such, one variant of the methodology allocates the access node (via its backhauling CMe) one or more prioritized UP data service flows for a prescribed period of time so as to enable complete data uplink transmission without undue delay, retransmission requests, etc., after which the service flow can be surrendered by the CMe (e.g., based on signaling from the IoT device or access node that data transmission is complete).

Network Architectures

Figure 6:
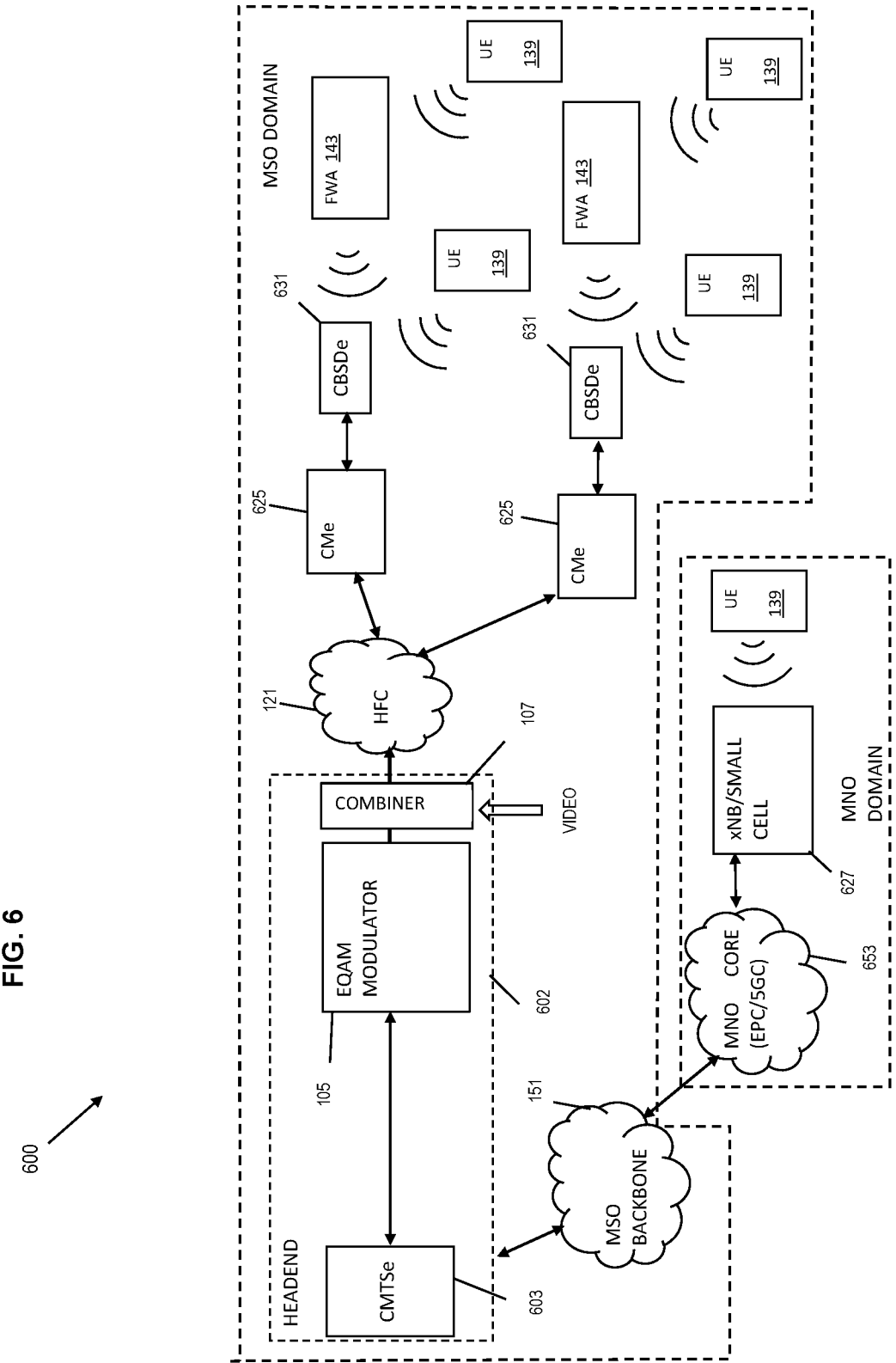
FIG. 6 is a block diagram illustrating one exemplary embodiment of network configuration with enhanced base station connectivity functionality according to the present disclosure.

FIG. 6 is a block diagram illustrating one exemplary embodiment of network configuration with enhanced base station connectivity functionality according to the present disclosure.

As a brief aside, the so-called modular headend architecture (MHA; see e.g. CableLabs Technical Report CM-TR-MHA-V02-081209, which is incorporated herein by reference in its entirety) essentially separates the downstream PHY layer out of the CMTS, and move it to a separate EQAM device. In this architecture, the CMTS transmits data to the EQAM via the Downstream External PHY Interface (DEPI). This architecture was introduced in order to reuse EQAM to modulate both the data bits as MPEG video bits. The upstream receiver is kept in the CMTS in the MHA.

In contrast, another architecture used in implementing headend platforms is the Converged Cable Access Platform (CCAP). In order to increase efficiency, the CCAP integrates the EQAM and CMTS into one platform. In addition, in the CCAP, all the downstream traffic, including DOCSIS and video QAMs are transmitted in a single port. The CCAP unifies the CMTS, switching, routing, and QAM modulator in one unit, so that all data and video are converted in IP packets before conversion to RF signals.

The Remote PHY technology, also known as Modular Headend Architecture Version 2 (MHAV2), removes the PHY from the CMTS/CCAP platform and places it in a separate access point that is interconnected with an IP network. One common location to place the remote PHY is the optical node that is located at the junction of the fiber and coax cable networks.

In the MHAV2 architecture, the CCAP includes two separate components, CCAP core and the Remote PHY Device (RPD). The CCAP core contains a CMTS core for DOCSIS, and an EQAM core for video. The CMTS core contains the DOCSIS MAC, upper layer DOCSIS protocols, all signaling functions, downstream and upstream scheduling. The EQAM core processes all the video processing. Similarly, an RMD (generally analogous to the RPD, but containing the DOC SIS MAC, also colloquially referred to a s a "Flex MAC") is also specified; see e.g., CableLabs Technical Re4port CM-TR-R-MACPHY-V01-150730, which is incorporated herein by reference in its entirety.

The RPD/RMD processes all the PHY related function, such as downstream QAM modulators, upstream QAM demodulators, upstream coders, downstream decoders, filtering, time and frequency synchronization, as well as the logic to connect to the CCAP core. One motivation for using such approaches as RPD/RMD is the ability to obviate analog fiber components between the headend and optical nodes, and rather utilize digital optical PHY and interfaces thereby enhancing quality at the nodes.

Hence, it will be appreciated by one of ordinary skill given the present disclosure that the exemplary network architectures described below with respect to FIGS. 6-8 may be readily adapted to any of the foregoing models or paradigms (e.g., MHA, MHAv2, etc.), and yet other configurations are possible, those of FIGS. 6-8 being merely non-limiting examples.

FIG. 6 is a functional block diagram illustrating a first exemplary configuration of an HFC network architecture apparatus according to the present disclosure, with enhanced CMTS (CMTSe) and EQAMs located at a cable system headend 602. This embodiment leverages existing architectures which utilize a headend-based CMTS and EQAM, yet with further expansion of CMTS capabilities. Specifically, as described in detail subsequently herein, the enhanced CMTSe 603 shown includes additional logic which supports the prioritization and latency reduction functions described herein.

As shown, the architecture 600 of FIG. 6 includes the CMTSe 603, as well as switch logic that interfaces the CMTSe with one (or more) EQAMs 105. Output of the EQAMs is combined with video and other signals, and the combined (optical domain) signal transmitted downstream via optical fiber to one or more nodes within the HFC topology (not shown in FIG. 6) for ultimate delivery to CMe devices 625 for use by premises CPE (such as e.g., CBSDe devices 631, Wi-Fi-enabled routers, PCs, gateways, or other devices) within the served premises. UE 139 and FWA 143 may be served by the CBSDe devices at each premises as shown. For instance, in one model, the CBSDe 631 is disposed on a building rooftop, and mobile users can access the CBSDe via e.g., CBRS-band spectrum. In another model, the CBSDe is a high power (CAT. A) CBRS device which is used as a wireless backhaul for a number of FWA devices 143 (effectively fixed 3GPP UE that service e.g., residential premises). Many other models are possible.

In the embodiment of FIG. 6, the MSO domain is interfaced with an external MNO domain via the MSO backbone 151, such as where an MNO-operated EPC/5GC 653 which also services MNO cells (cellular xNBs) and small cells 627 is the cognizant core for the MSO domain users.

FIG. 7 is a functional block diagram illustrating a second exemplary configuration of an HFC network architecture apparatus according to the present disclosure, with enhanced CMTS (CMTSe) 603 co-located (at least topologically) with an MSO-based core 751. In this model, the MSO domain contains all necessary components for e.g., UE attach procedures and packet session establishment, and any MNO based networks and their EPC/5GC infrastructure (not shown) are considered external. In that the UE's 139 are associated with MSO subscriber premises and subscriptions, and the core infrastructure is part of this "home" network, significant economies can be realized, as well as reduced latencies associated with network attachment and session management, since the MSO maintains control of all relevant processes (including timing delays which may otherwise be induced by external operator's equipment over which the MSO has no control).

In contrast, in the embodiment of FIG. 6 previously discussed, the architecture 600 is divided among two or more entities, such as an MNO and an MSO. As shown, the MSO service domain extends only to the CBSDe and served premises and the MSO core functions, while other functions such as 3GPP EPC/E-UTRAN or 5GC and NG-RAN functionality is provided by one or more MNO networks operated by MNOs with which the MSO has a service agreement.

In some embodiments, the architectures shown above may also include an MSO-managed and operated VoIP server which acts in effect as an equivalent of the 3GPP core for "cellular" calls; the server manages user/device authentication, call routing, etc. roughly analogous to the more sophisticated 3GPP procedures, and may likewise include timing and latency requirements, including for user plane data so as to avoid call "jerkiness" or temporal artifact during VoIP calls. It will be recognized that a 3GPP UE 139 might also have a VoIP stack operative thereon, such that the UE can utilize the VoIP server (not shown) via an established IP session (whether via a Wi-Fi connection to an AP which is backhauled by the CMe, or via a 3GPP NR-U or CBRS session conducted via the CBSDe). To this end, the present disclosure envisions that other types of access devices with stringent timing or other requirements may be configured similar to the CBSDe described in greater detail below. For instance, a Wi-Fi 802.11ax ("6") AP may be enhanced with IP packet marking capability such that a VoIP call conducted using a user's PC or laptop with microphone and headset is "prioritized" in one manner or another, whether at the network/control plane or user data plane, by congested CMe/CMTSe, such as during an emergency 911 call.

Figure 8:
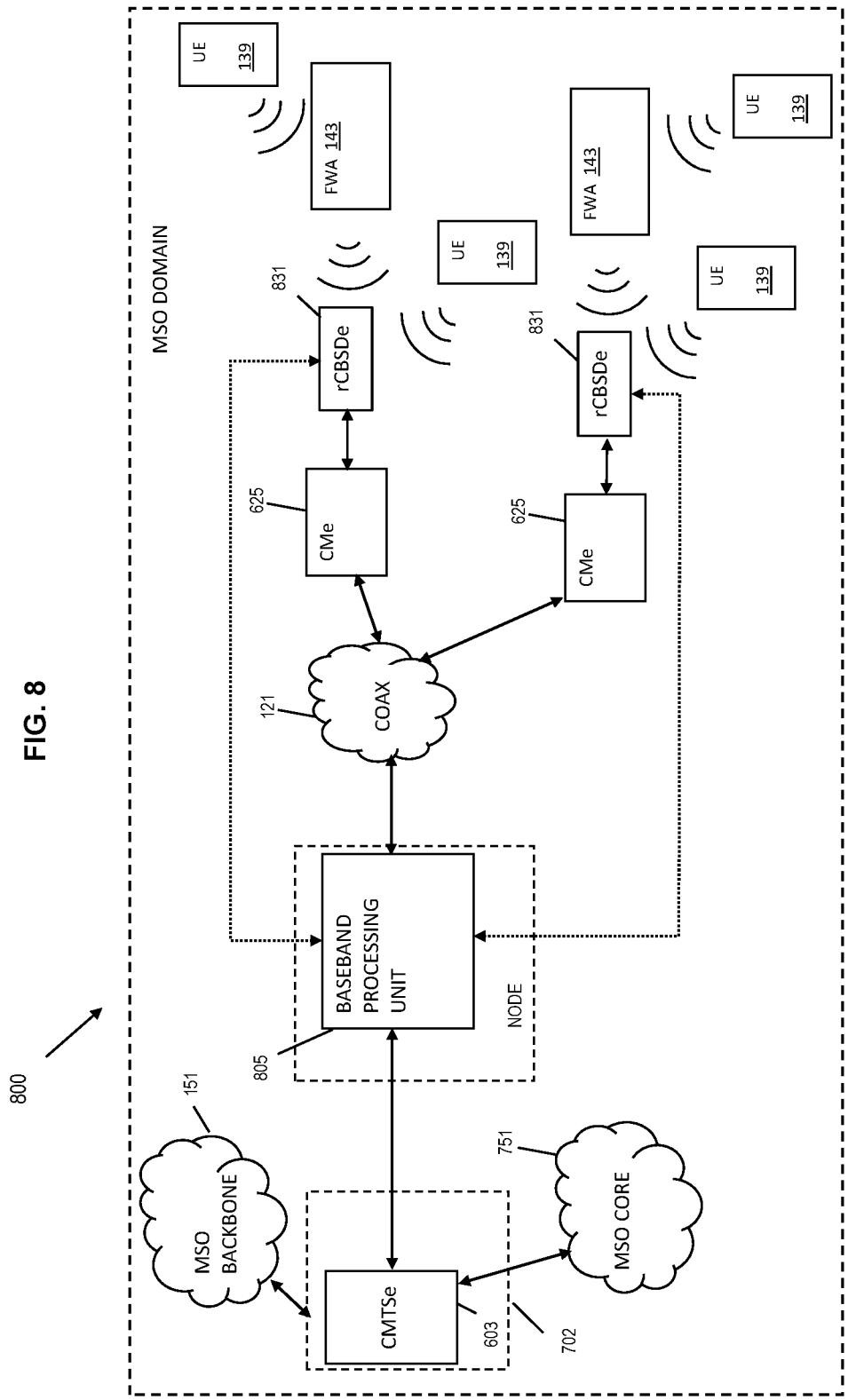
FIG. 8 is a block diagram illustrating yet another exemplary embodiment of network configuration with enhanced base station connectivity functionality according to the present disclosure, wherein a network-based baseband processing functionality is utilized.

FIG. 8 is a block diagram illustrating yet another exemplary embodiment of network configuration with enhanced base station connectivity functionality according to the present disclosure, wherein a network-based baseband processing functionality is utilized. In this architecture 800, the xNBe/CBSDe functionality is partitioned into an rCBSDe (reduced-profile CBSDe) 831 and a BBU (baseband processing unit) 805 as shown. The rCBSDe devices include antennae and RF front end processing (as well as packet generation and encapsulation functions), while the BBU 805 is configured to perform baseband processing of the packetized data for two or more rCBSDes 831 in support of e.g., the wireless protocols used by the rCBSDe(s) 831.

The BBU 805 is in the illustrated embodiment disposed at a network distribution node of the HFC infrastructure, although it can be located at other points in the network as well (such as at the headend, and co-located with the CMTSe 603).

In one implementation, the BBU 805 operates to receive data originated by the rCBSDe devices 831 and transmitted over the wireline PHY between the CMe and the CMTSe. For instance, in one such approach, each rCBSDe 831 includes sufficient processing to receive wireless signals from a UE or FWA (i.e., according to 3GPP protocols) such as relating to control plane functions including synchronization and/or RRC connection and attachment by a UE, and packetize the control plane data into Layer 2/3 packets for transmission to the BBU 805 via the wireline backhaul. For example, the rCBSDe can generate IP packets which can be designated as previously described (e.g., explicitly as SYN packets), and passed to the BBU 805 via a prioritized service flow between the CMTSe and the CMe associated with the rCBSDe, with the CMe queuing the packets in the appropriate service flow buffer(s) based on the detected type in e.g., the IP header. Likewise, in another variant, the 3GPP control plane data can be encapsulated in Ethernet or MAC frames, designated or marked, and routed according to such protocols, including to the BBU 805.

In one variant, the BBU 805 includes necessary modem(s) for communication on the wireline PHY (e.g., DOCSIS compatible modem capability in US and DS directions), and can be a logical endpoint for the packets generated by the rCBSDe(s) 831. For instance, the BBU may act effectively as a pass-through for data packets between the CMTSe and the CMe, with the exception of packets addressed to the BBU as an endpoint (i.e., in the US direction), or for the rCBSDe or a UE attached thereto (in the DS direction).

CMTSe Apparatus

Figure 9:
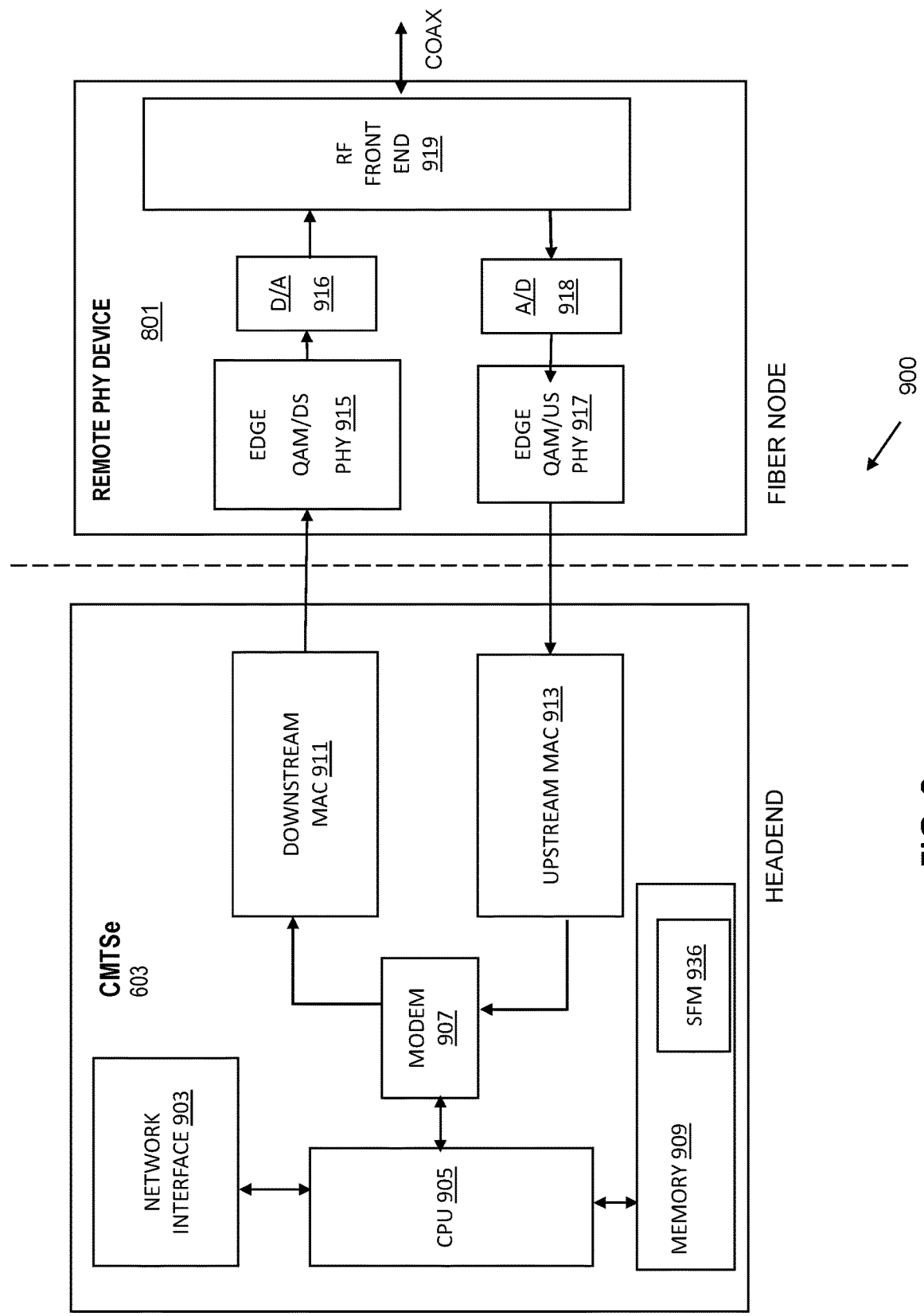
FIG. 9 is a block diagram illustrating one exemplary embodiment of network converged headend and remote PHY device (RPD) configuration with enhanced CMTS and connectivity functionality according to the present disclosure.

FIG. 9 is a block diagram illustrating one exemplary embodiment of network converged headend and remote PHY device (RPD) architecture 900 with enhanced CMTS and connectivity functionality according to the present disclosure. In the Remote PHY (R-PHY) architecture, which is a distributed access architecture, the PHY layer is moved from CMTSe (headend) to the fiber nodes within the HFC network. By decreasing the distance to client device, the R-PHY can achieve higher bandwidth and throughput than a modular or integrated CCAP architecture, and hence tit can provide higher bandwidth and throughput. It will be appreciated however that non RPD/RMD based variants may be used as well consistent with the present disclosure, such as via the modular CCAP or integrated CCAP architectures. In such architectures, the PHY and MAC layers are implemented in the headend.

As illustrated, the architecture 900 includes one CMTSe module 603 physically located at the headend, and one or more R-PHY modules physically located at fiber nodes. The CMTSe device 603 includes a processor 905, modem 907 (which may be integrated in the CPU 905, or implemented as a separate processor or ASIC as shown), RF front end 919, downstream MAC 911, upstream MAC 913, upstream PHY 917, RF front end 918, memory 909, and SFM logic 936 integrated in memory module 909.

Additionally, the exemplary embodiment 900 includes a network interface 903 that interfaces CMTSe 603 to connect to a data network (e.g., MSO backbone and/or other network as described in FIGS. 6-8).

The components of the CMTSe device 603 shown in FIG. 9 may be individually or partially implemented in software, firmware or hardware.

In the exemplary embodiment, the processor(s) 905, 907 may include one or more of a digital signal processor, microprocessor, field-programmable gate array, GPU, or plurality of processing components mounted on one or more substrates. The processor may also comprise an internal cache memory, and is in communication with a memory subsystem 909, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor(s) 905, 907.

The downstream MAC 911 adds overhead (e.g., MAC address, Automatic Repeat request (ARQ)) to data, and divides the date stream into MAC frames. Likewise, an US MAC 913 is provided for data traffic sent from e.g., the CMe(s).

The SFM logic 936, among other functions, identifies the transmitted packets from the CBSDe 631 (via the CMe 625), reads the header fields to determine the packet type (e.g., BS associated), and allocates the required service flows and resources to the serving CMe. Also, depending on the type of the received packet from the CMe, the CMTSe 603 prioritizes the various service flows. As described previously, in one embodiment the highest priority is assigned to the "BS_SYN" service flow through which "attach" packets are routed so as to prevent latency-induced timeouts.

In the RPD, the Edge QAM/Downstream PHY module 915 receives the MAC data from the module 911, adds redundancy (e.g., Forward Error Control Coding (FEC)) to the data, and converts the data to PHY layer data and video signals (e.g., 16-QAM, 256-QAM). The D/A device 916 converts the digital received signal from module 915, and converts it to analog signal to be converted to RF signals by RF front end unit 919. The A/D module 918 receives the analog baseband signals from RF front end unit 919, and converts it to digital signal. The upstream PHY module 917 converts the received base baseband signal constellation to data bits. The data bits from PHY module 917 are divided in MAC frames by upstream MAC module 913, and decoded by modem IM 907.

The RF front end 919 includes RF circuits to operate in e.g. DOCSIS 3.1 or 4.0 supported frequency spectrum (5-42 MHz upstream, 43-366 MHz VOD, SVD, broadcast channels, 367-750 MHz, 751 MHz-1.2 GHz downstream). The modem 907 generates the upstream and downstream PHY/MACH control and data, timing, and synchronization signals. The CPU 905 is the main processing component in the CMTSe device 603; it generates the signal to control other components in the CMTSe 603 and the network (including the various CMe to which it is connected), fetches and stores data from memory 909, and generates the signals and commands for the network interface 903.

Base Station Apparatus

Figure 10:
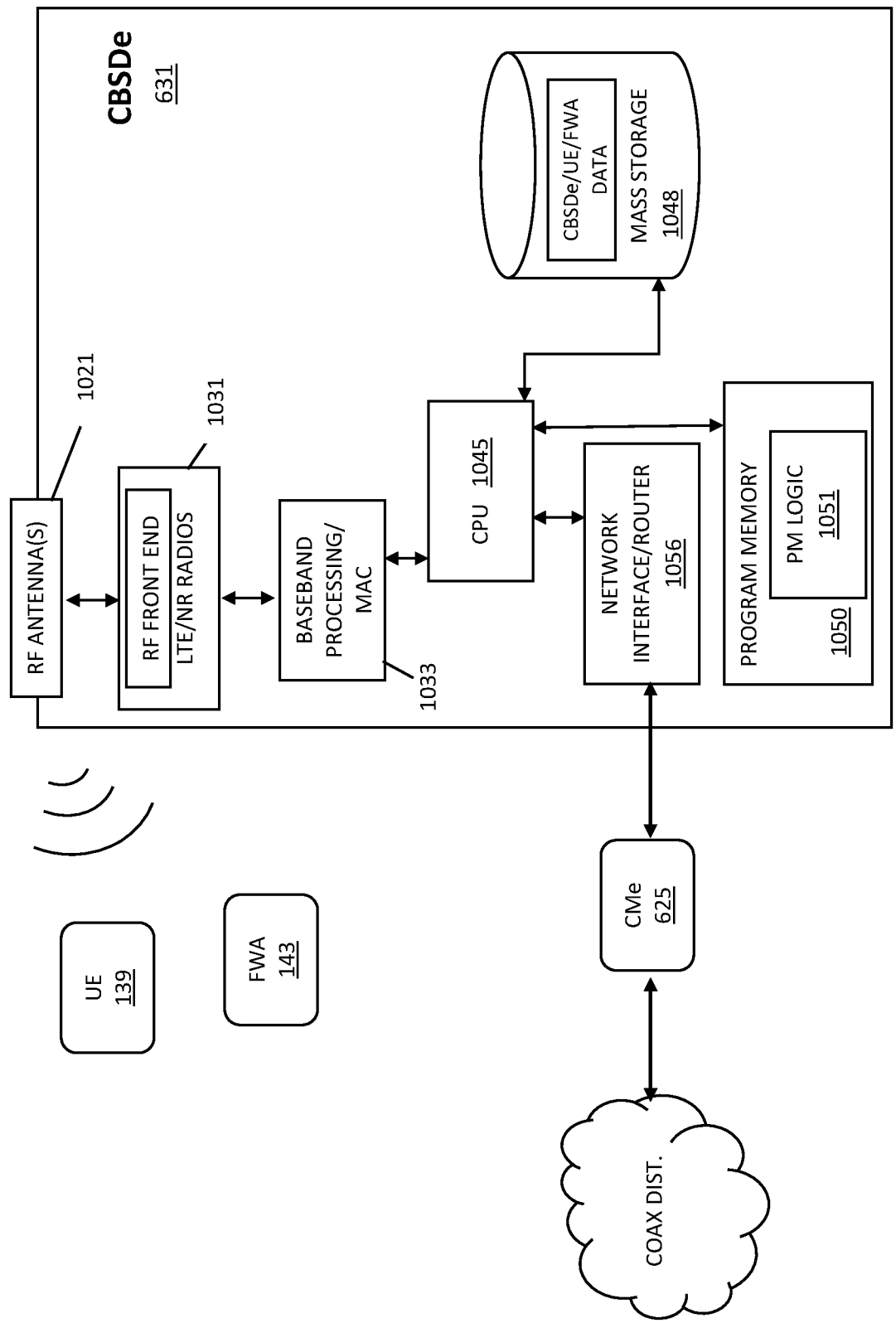
FIG. 10 is a block diagram illustrating one exemplary embodiment of base station (e.g., CBSDe) apparatus configured for provision of enhanced connectivity according to the present disclosure.

FIG. 10 is a block diagram illustrating one exemplary embodiment of base station (e.g., CBSDe) apparatus configured for provision of enhanced connectivity according to the present disclosure.

As shown, the CBSDe 607 includes, inter alia, a processor apparatus or subsystem 1045, a program memory module 1050, mass storage 1048, RPC logic 1006, one or more network interfaces 1056, as well as one or more radio frequency (RF) devices 1031 having, inter alia, antenna(e) 1021 and one or more 4G/5G radio(s).

At a high level, the CBSDe maintains in effect two "stacks"; (i) a CBRS-compliant stack for communication of the CBSDe (acting as a CBRS-compliant entity) with other CBRS entities such as SAS/DP, according to e.g., the Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, Jan. 2018, incorporated herein by reference in its entirety; and (ii) a 3GPP-compliant LTE/LTE-A/5G NR "stack" (acting as a EUTRAN eNB or 5G gNB) communications with 3GPP-compliant UEs (mobile devices 139).

The PM logic 1051 manages the designation of IP packets within the CBSDe and transmission to the CMTSe 603 via the CMe 625. In this process, the PM logic 1051 adds a base station "identifier" or other designator in the IP packet header that denotes the packet type and the base station identity (either generically or specifically as desired). In some embodiments, the PM 1051 may be configured to add additional marking or identifiers to certain packets, so as to e.g., associate them with a particular function or service flow established within the CMe. For example, packets containing 3GPP attach data as previously described may be marked as "SYN" or "ATTACH" packets and based thereon, routed by the CMe to the appropriate queues associated with specific service flows. Alternatively, the PM 751 may simply address certain packets to certain sockets or ports within the CMe.

In the exemplary embodiment, the processor 1045 may include one or more of a digital signal processor, microprocessor, field-programmable gate array, GPU or plurality of processing components mounted on one or more substrates. The processor 1005 may also comprise an internal cache memory, and is in communication with a memory subsystem 1050, which can comprise, e.g., SRAM, flash and/or SDRAM components.

The memory subsystem may implement one or more of DMA type hardware, so as to facilitate data accesses as is well known in the art. The memory subsystem of the exemplary embodiment contains computer-executable instructions which are executable by the processor. Other embodiments may implement such functionality within dedicated hardware, logic, and/or specialized co-processors (not shown).

The RF antenna(s) 1021 are configured to detect and transceive signals from radio access technologies (RATs) in the service area or venue with which the CBSDe is associated. For example, LTE (including, e.g., LTE, LTE-A, LTE-U, LTE-LAA) signals may be used as the basis of communication between the CBSDe 631 and the various mobile devices (e.g., UEs 139) or FWA 143. The antenna(s) 1021 may include multiple spatially diverse individual elements in e.g., a MIMO- or MISO-type configuration, such that spatial diversity of the transceived signals can be utilized.

In the exemplary embodiment, the radio interface(s) 1031 comprise one or more LTE/5G-based radios compliant with 3GPP. Additional unlicensed, licensed, or quasi-licensed air interfaces may also be used within the CBSDe, including e.g., Wi-Fi, non-CBRS band LTE, 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 16 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core). As such, 5G NR capable CBSDe may also find significant utility in prioritized scheduling of some IP packets within the DOCSIS backhaul system as described herein.

The RF radios 1031 in one embodiment comprises a digitally controlled RF tuner capable of reception of signals via the RF front end (receive chain) of the RF radio(s) in the aforementioned bands, including in one variant simultaneous reception (e.g., both 2.300 to 2.500 and 3.550 to 3.700 GHz bands at the same time).

CMe Apparatus

Figure 11:
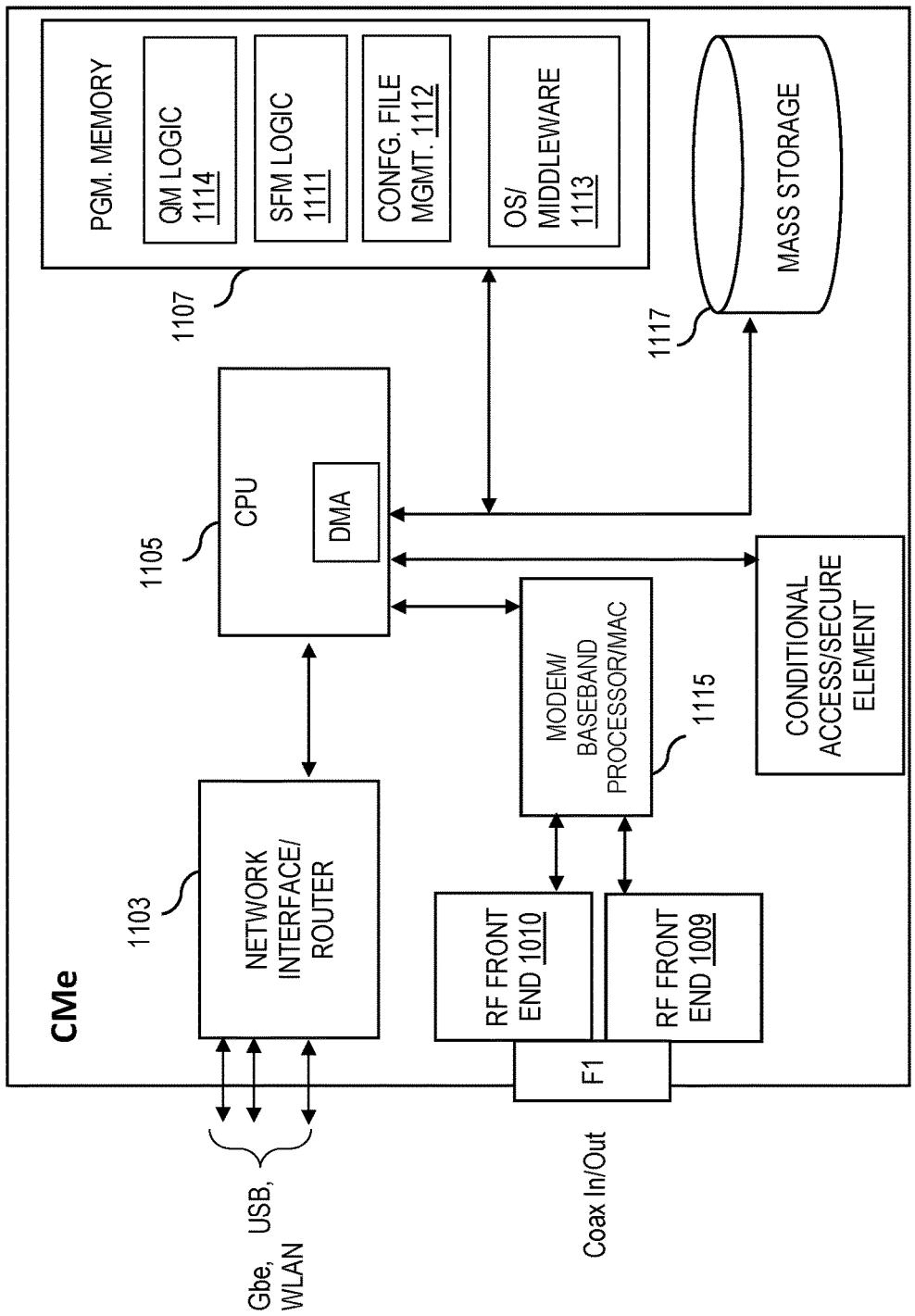
FIG. 11 is a block diagram illustrating one exemplary embodiment of a cable modem (CMe) apparatus configured for provision of enhanced connectivity according to the present disclosure.

FIG. 11 is a block diagram illustrating one exemplary embodiment of a cable modem (CMe) apparatus 625 configured for provision of enhanced connectivity according to the present disclosure.

At high level, the CMe apparatus 625 includes, inter alia, a processor apparatus 1105, a program memory module 1107, mass storage 1117, one or more RF front ends 1109, 1110 for processing RF signals received and transmitted over the coaxial "last mile" network, baseband processor/modem chipset 1115, as well as one or more network interfaces 1103 such as, Gigabit Ethernet or other LAN/WLAN connectivity, support of home or premises gateways, DSTBs, 3GPP small cells, etc. within the premises, etc.

The RF modules 1109, 1110 include a heterodyne-based transmitter/receiver architecture generally symmetrical to the transmitter/receiver of the enhanced CMTSe/node 413 discussed previously; i.e., impedance matching circuitry, diplexer, synchronization circuit, tilt, etc. are used as part of the CMe RF front ends, as well as RF tuner apparatus. The RF front ends are used to convert the received signal from frequency bands (366-750 MHz and 750 MHz-1.2 GHz) to baseband, and the inverse for transmission. A common F1-type connector for interface between the coaxial network and RF front end(s) is shown, although other approaches may be used as well.

Moreover, while two separate RF front ends 1110, 1109 are shown in this embodiment, a single device covering the entirety of the desired frequency range may be used with generally equal success.

The network interface module 1103 may include for example GbE Ethernet/WLAN/USB ports, which allows interface between the CMe module and premises devices such as CBSDe devices 631, WLAN routers, DSTB devices, computers, etc., to support data interchange between the CMe and the device.

In the exemplary embodiment, the host processor (CPU) 1105 may include one or more of a digital signal processor, microprocessor, GPU, field-programmable gate array, or plurality of processing components mounted on one or more substrates. The processor 1105 may also comprise an internal cache memory, and is in communication with a memory subsystem 1107, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1105, including the OS and middleware 1113 (e.g., executing a Linux or other kernel).

The processor 1105 is configured to execute at least one computer program stored in memory 1107 (e.g., a non-transitory computer readable storage medium); in the illustrated embodiment, such programs include logic to implement the prioritized service flow management functionality described previously herein (including CM configuration file logic 1112, and SFM logic 1111 for upstream packet inspection and routing logic, as well as coordinating with CMTSe logic for implementation and utilization of the prioritized service flows, including maintaining service flow QoS parameters, target port/socket data, and other relevant data). Other embodiments may implement such functionality within dedicated hardware, logic, and/or specialized co-processors or ASICs (not shown).

The CMe is further configured with que management (QM) logic 1114, which is used to monitor and maintain service flow queue levels (e.g., for the BS_SYN dedicated queue) consistent with e.g., the method of FIG. 3E previously described herein.

The CMe logic also includes a hierarchy of software layers and communication protocols to enable RF carrier detection, reporting and synchronization, communication with the CMTSe 603, interaction with PHY layer and hardware, routing data from/to the HFC network, Layer 2/3 functions, etc.

Exemplary Communications Flow

Figure 12:
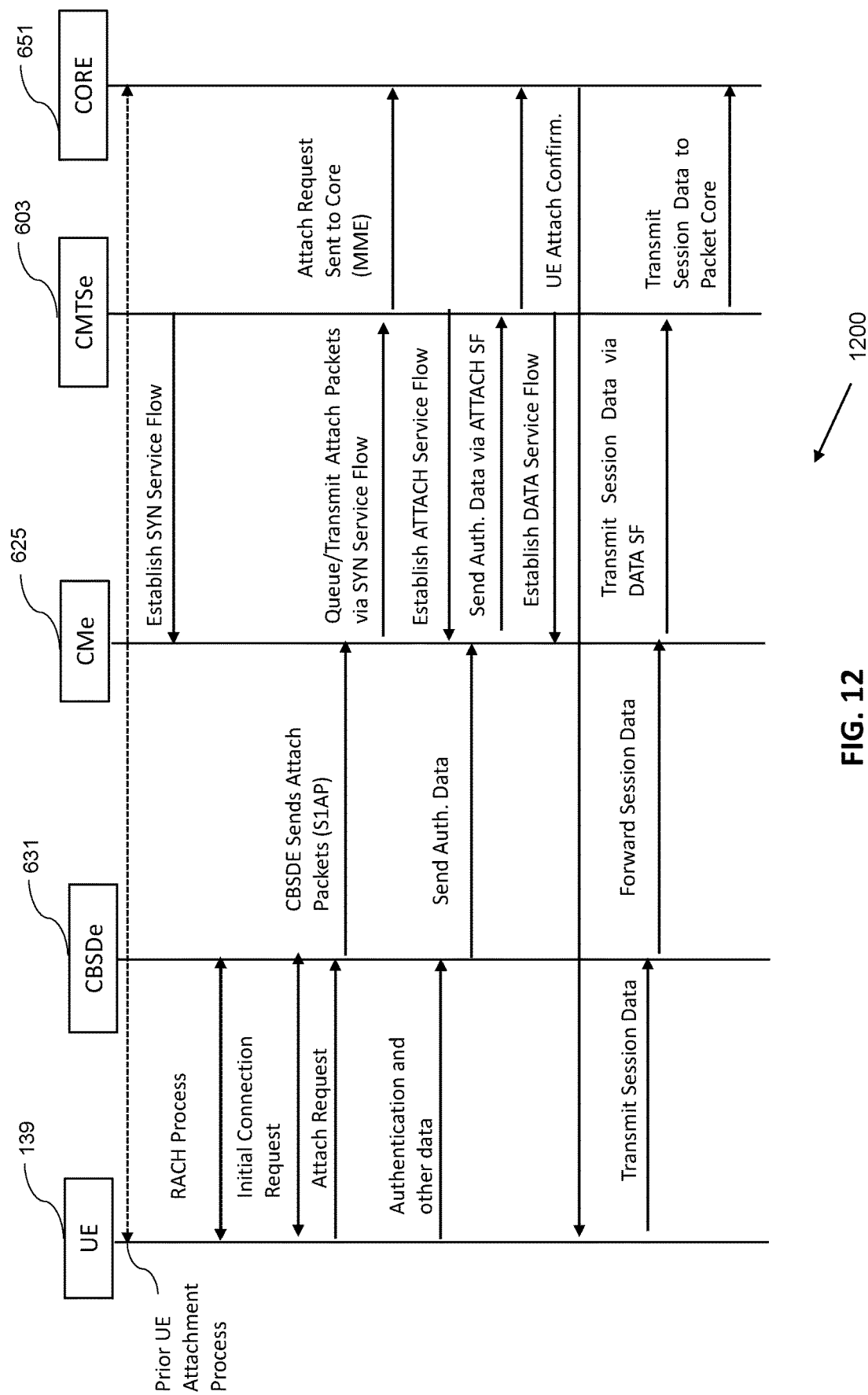
FIG. 12 is a ladder diagram illustrating communication flow between UE, CBSDe, CMe, CMTSe, and network core according to one embodiment of the present disclosure.

FIG. 12 is a ladder diagram illustrating communication flow between UE, CBSDe, CMe, CMTSe, and network core according to one embodiment of the present disclosure. It will be appreciated that while described in the context of the exemplary architectures of FIGS. 6 and 7, the illustrated flow is readily adapted to other architectures (such as that of FIG. 8 herein) by one of ordinary skill given the present disclosure.

As shown in FIG. 12, a UE 139 and the core (e.g., EPC or 5GC) 651 initially negotiate an attachment (wherein the UE is ultimately assigned an IP address) as previously described. Pursuant to this procedure, the CMTSe establishes at least a SYN service flow as shown between itself and the CMe, based on the UE data packets transacted (i.e., the CMTSe becomes aware of the CBSDe 631 serviced by the CMe).

Thereafter, the UE (same, or a different UE) conduct RACH and RRC connection procedures, including attachment request and UE authentication to the core, using the established SYN service flow. The CMTSe may, as shown, further establish ATTACH and DATA service flows for various control plane and user plane transactions as shown (e.g., the UE transmitting attachment requests upstream to the core via the CBSDe and CMe, or the UE transmitting IP UP data associated with an application/session upstream to a distant application server).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a packet network infrastructure comprising at least one packet receiver apparatus and at least one packet transmitter apparatus, the computerized method comprising;
    identifying, at the at least one packet receiver apparatus, a first type of wireless equipment connected to the at least one packet transmitter apparatus;
    based at least on the identifying, causing establishment of at least one prioritized service flow between the at least one packet receiver apparatus and the at least one packet transmitter apparatus; and
    utilizing the established at least one prioritized service flow to route time-sensitive data packets between the at least one packet transmitter apparatus and the at least one packet receiver apparatus, the utilizing of the established at least one prioritized service flow to route the time-sensitive data packets between the at least one packet transmitter apparatus and the at least one packet receiver apparatus comprising routing at least user equipment (UE) attachment message data via the at least one prioritized service flow, the at least UE attachment message data configured to attach a UE wirelessly connected to the first type of the wireless equipment to a core network, the core network in data communication with the at least one packet receiver apparatus via at least a backhaul network.

2. The computerized method of claim 1, wherein:
    the packet network infrastructure comprises a DOCSIS (data over cable service specification) packet data system;
    the at least one packet receiver apparatus comprises a cable modem termination system (CMTS); and
    the at least one packet transmitter apparatus comprises a cable modem (CM).

3. The computerized method of claim 2, wherein the identifying, at the at least one packet receiver apparatus, the first type of the wireless equipment connected to the at least one packet transmitter apparatus comprises identifying, at the CMTS, a wireless base station connected to the CM based at least in inspecting one or more packet headers for packets transmitted by the CM to the CMTS, the one or more packet headers of the transmitted packets having been marked with a prescribed designation by the wireless base station.

4. The computerized method of claim 3, wherein:
    the wireless base station comprises a 3GPP (Third Generation Partnership Project) compliant base station operating within a quasi-licensed frequency band, and the routing of the at least UE attachment message data via the at least one prioritized service flow comprises routing at least 3GPP UE (user equipment) attachment message data via the at least one prioritized service flow.

5. The computerized method of claim 1, wherein the utilizing the established at least one prioritized service flow to route the time-sensitive data packets between the at least one packet transmitter apparatus and the at least one packet receiver apparatus comprises avoiding or precluding use of one or more queue management algorithms which are configured to drop one or more queued packets.

6. The computerized method of claim 5, wherein:
    the packet network infrastructure comprises a DOCSIS (data over cable service specification) packet data system;
    the at least one packet receiver apparatus comprises a cable modem termination system (CMTS);
    the at least one packet transmitter apparatus comprises a cable modem (CM); and
    the one or more queue management algorithms comprise one or more DOCSIS active queue management (AQM) algorithms.

7. The computerized method of claim 5, wherein the causing of the establishment of the at least one prioritized service flow between the at least one packet receiver apparatus and the at least one packet transmitter apparatus comprises specifying a plurality of QoS (quality of service)

parameters consistent with one or more temporal requirements associated with the routing of the time-sensitive data packets.

8. Computerized modem apparatus for use in a data network, comprising:
   a radio frequency (RF) interface;
   at least one packet data interface;
   processor apparatus in data communication with the at least one packet data interface and the RF interface; and
   storage apparatus in data communication with the processor apparatus, the storage apparatus comprising at least one computer program configured to, when executed by the processor apparatus, cause the computerized modem apparatus to:
      identify a wireless access node in data communication with a receiver apparatus over a network, the wireless access node configured to transmit time-sensitive data packets;
      based on the identification, establish one or more prioritized service flows between the computerized modem apparatus and the receiver apparatus, the establishment of the one or more prioritized service flows comprising establishment of at least a prioritized service flow dedicated to attachment of a wireless client device wirelessly connected to the wireless access node to a core network, the core network in data communication with the receiver apparatus via at least a backhaul network; and
      utilize the established one or more prioritized service flows to route at least a portion of the time-sensitive data packets from the wireless access node to the receiver apparatus.

9. The computerized modem apparatus of claim 8, wherein:
   the receiver apparatus comprises a DOCSIS cable modem termination system (CMTS); and
   the computerized modem apparatus comprises a DOCSIS cable modem (CM).

10. The computerized modem apparatus of claim 8, wherein the at least one computer program is further configured to, when executed by the processor apparatus, cause the computerized modem apparatus to:
   execute computerized logic to perform at least one of: (i) inspection of one or more data fields of a header of one or more of the time-sensitive data packets, or (ii) receipt of the one or more of the time-sensitive data packets at a prescribed data packet port or socket of the computerized modem apparatus.

11. The computerized modem apparatus of claim 8, wherein the at least one computer program is further configured to, when executed by the processor apparatus, cause the computerized modem apparatus to:
   queue the at least portion of the time-sensitive data packets in a prescribed buffer associated with the one or more prioritized service flows.

12. The computerized modem apparatus of claim 11, wherein the at least one computer program is further configured to, when executed by the processor apparatus, cause the computerized modem apparatus to:
   monitor at least one aspect of the prescribed buffer; and
   based at least on the monitoring, cause a change to at least one routing parameter associated with the routing of the queued at least portion of the time-sensitive data packets.

13. The computerized modem apparatus of claim 12, wherein:
   the at least one aspect of the prescribed buffer comprises at least one of buffer depth or fill rate; and
   the causation of the change to the at least one transmission parameter associated with transmission of the queued at least portion of the time-sensitive data packets comprises negotiation of a modulation and coding scheme (MCS) higher in order than one in use prior to the change.

14. The computerized modem apparatus of claim 8, wherein:
   the core network comprises at least one of a 3GPP EPC (evolved packet core) or 3GPP 5GC (5G Core); and
   the attachment of the wireless client device comprises attachment of a 3GPP UE (user equipment) to the core network via 3GPP attach and session establishment protocols.

15. Computerized network apparatus for use in a packet data network, comprising:
   at least one first packet data interface for packet data communication with a radio frequency modulation-demodulation apparatus;
   at least one second packet data interface for packet data communications with a backhaul network;
   processor apparatus in data communication with the at least one first packet data interface and the at least one second packet data interface; and
   storage apparatus in data communication with the processor apparatus, the storage apparatus comprising at least one computer program configured to, when executed by the processor apparatus, cause the computerized network apparatus to:
      receive first data packets via the at least one first packet data interface;
      determine that at least a portion of the received first data packets are sourced from a wireless access node in data communication with the radio frequency modulation-demodulation apparatus; and
      cause establishment of one or more prioritized upstream service flows between the radio frequency modulation-demodulation apparatus and the computerized network apparatus to route the at least portion of the first data packets, the one or more prioritized upstream service flows between the radio frequency modulation-demodulation apparatus and the computerized network apparatus comprising at least one data flow dedicated to attachment of a wireless client device wirelessly connected to the wireless access node to a core network, the core network in data communication with the computerized network apparatus via the at least one second packet data interface and the backhaul network.

16. The computerized network apparatus of claim 15, wherein:
   the computerized network apparatus comprises a CMTS within a hybrid fiber coax (HFC) network;
   the wireless access node comprises a Third Generation Partnership Project (3GPP)-compliant CBSD (Citizens Broadband Service Device) operative within a frequency band of 3.550 to 3.700 GHz;
   the core network comprises at least one of a 3GPP EPC (evolved packet core) or 3GPP 5GC (5G Core); and
   the attachment of the wireless client device comprises attachment of a 3GPP UE (user equipment) to the core network via 3GPP attach and session establishment protocols.

17. The computerized network apparatus of claim 15, wherein the at least one computer program configured to, when executed by the processor apparatus, cause the computerized network apparatus to:

selectively cause the establishment of the one or more prioritized upstream service flows between the radio frequency modulation-demodulation apparatus and the computerized network apparatus based at least on a detected level of upstream packet data congestion associated with the computerized network apparatus.

18. The computerized network apparatus of claim 15, wherein the one or more prioritized upstream service flows between the radio frequency modulation-demodulation apparatus and the computerized network apparatus comprise establishment of at least a user-plane (UP) data-supporting service flow.

19. The computerized network apparatus of claim 15, wherein causation of the establishment of the one or more prioritized upstream service flows between the radio frequency modulation-demodulation apparatus and the computerized network apparatus comprises identification of a plurality of QoS (quality of service) parameters consistent with one or more temporal requirements associated with the routing of the portion of the received first data packets.

20. The computerized network apparatus of claim 15, wherein the at least one computer program configured to, when executed by the processor apparatus, cause the computerized network apparatus to:

utilize the established one or more prioritized upstream service flows to route the at least portion of the first data packets to a computerized client device registered to utilize Citizens Band Radio Service (CBRS)-band quasi-licensed spectrum, the established one or more prioritized upstream service flows configured to prioritize the registered computerized client device over existing data traffic between the radio frequency modulation-demodulation apparatus and the computerized network apparatus.

* * * * *